(12) United States Patent
Jones et al.

(10) Patent No.: US 8,849,213 B2
(45) Date of Patent: Sep. 30, 2014

(54) INTEGRATED CIRCUIT FOR SIGNAL ANALYSIS

(75) Inventors: Ben William Jones, Austin, TX (US); Douglas A. Mammoser, Austin, TX (US); John M. Morton, Austin, TX (US); Nils Bagge, Austin, TX (US); Bhavin Bhulani, Austin, TX (US); Matthew P. Wingert, Cedar Park, TX (US); Harrison J. Killian, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 532 days.

(21) Appl. No.: 12/623,598

(22) Filed: Nov. 23, 2009

(65) Prior Publication Data

US 2010/0184384 A1 Jul. 22, 2010

Related U.S. Application Data

(63) Continuation-in-part of application No. 12/357,307, filed on Jan. 21, 2009.

(51) Int. Cl.
*H04B 17/00* (2006.01)

(52) U.S. Cl.
USPC .................................... 455/67.11; 455/161.1

(58) Field of Classification Search
CPC ............ H04L 27/2601; H04L 27/2626; H04L 5/0007; H04L 1/04; H04L 27/2082; H04L 5/023; H04L 2025/03414; H04L 25/03159; H04L 1/0618; H04L 27/265; H04L 41/0896; H04L 43/00; H04B 1/71632; H04B 1/71637; H04B 14/026; H04B 7/0697; H04B 7/12; H04B 7/02; H04B 17/0042; H04B 7/06; H04W 52/225; H04W 52/42; H04W 16/14; H04W 48/16; H04W 52/0245

USPC ................ 455/67.11, 161.1, 434, 418, 422.1; 375/224, 130, 147, 354, 232, 219, 225, 375/267, 340; 370/208, 210, 211, 480, 510
See application file for complete search history.

(56) References Cited

U.S. PATENT DOCUMENTS 2,292,387 A 8/1942 Markey et al.
4,328,581 A 5/1982 Harmon et al.
(Continued)

FOREIGN PATENT DOCUMENTS

CA 02252012 10/1998
DE 3415032 A1 11/1984
(Continued)

OTHER PUBLICATIONS

Defendants Joint Invalidity Contentions, Exhibit I2, *Bandspeed Inc. v. Acer, Inc. et al.*, 2:10-CV00215, U.S. Patent No. 7,280,580 filed Oct. 15, 1999 to Haartsen compared with U.S. Patent No. 7,027, 7,570,614, 29 pages.

(Continued)

*Primary Examiner* — Golam Sorowar
(74) *Attorney, Agent, or Firm* — Hickman Palermo Truong Becker Bingham Wong LLP; Edward A. Becker

(57) ABSTRACT

An integrated circuit comprises a main bus, one or more integrated processors, an external bus interface, memory, internal bus controller, a signal analyzer, timers, reset/clock generator, radio controller, optional data converters, and optional radio. The signal analyzer performs both time-domain and frequency-domain analysis of the input signal and supplies data to the one or more integrated processors for signal classification.

20 Claims, 12 Drawing Sheets

(56) References Cited

U.S. PATENT DOCUMENTS

| | | |
|---|---|---|
| 4,334,322 A | 6/1982 | Clark, III |
| 4,337,822 A | 7/1982 | Hyltin et al. |
| 4,355,399 A | 10/1982 | Timor |
| 4,554,668 A | 11/1985 | Deman et al. |
| 4,597,087 A | 6/1986 | Kadin |
| 4,716,573 A | 12/1987 | Bergstrom et al. |
| 4,872,182 A * | 10/1989 | McRae et al. .................. 375/141 |
| 4,914,699 A | 4/1990 | Dunn et al. |
| 4,937,822 A | 6/1990 | Weddle et al. |
| 4,977,612 A | 12/1990 | Wilson |
| 4,998,290 A | 3/1991 | Olenick et al. |
| 5,079,768 A | 1/1992 | Flammer |
| 5,179,569 A | 1/1993 | Sawyer |
| 5,287,384 A | 2/1994 | Avery et al. |
| 5,323,447 A | 6/1994 | Gillis et al. |
| 5,337,002 A | 8/1994 | Mercer |
| 5,361,401 A | 11/1994 | Pirillo |
| 5,377,221 A | 12/1994 | Munday et al. |
| 5,377,222 A | 12/1994 | Sanderford, Jr. |
| 5,394,433 A | 2/1995 | Bantz et al. |
| 5,418,839 A | 5/1995 | Knuth et al. |
| 5,448,593 A | 9/1995 | Hill |
| 5,452,319 A | 9/1995 | Cook et al. |
| 5,483,557 A | 1/1996 | Webb |
| 5,515,369 A | 5/1996 | Flammer, III et al. |
| 5,515,396 A | 5/1996 | Dalekotzin |
| 5,541,954 A | 7/1996 | Emi |
| 5,586,141 A | 12/1996 | Ashdown et al. |
| 5,666,655 A | 9/1997 | Ishikawa et al. |
| 5,737,359 A | 4/1998 | Koivu |
| 5,757,539 A | 5/1998 | Min |
| 5,809,059 A | 9/1998 | Souissi et al. |
| 5,848,095 A | 12/1998 | Detsch |
| 5,859,662 A | 1/1999 | Cragun et al. |
| 5,870,391 A | 2/1999 | Nago |
| 5,887,022 A | 3/1999 | Lee et al. |
| 5,933,420 A | 8/1999 | Jaszewski et al. |
| 5,937,002 A | 8/1999 | Anderson et al. |
| 5,956,642 A | 9/1999 | Larsson et al. |
| 6,052,594 A | 4/2000 | Chuang et al. |
| 6,115,407 A | 9/2000 | Gendel et al. |
| 6,115,408 A | 9/2000 | Gendel et al. |
| 6,118,805 A | 9/2000 | Bergstrom et al. |
| 6,122,309 A | 9/2000 | Bergstrom et al. |
| 6,130,885 A | 10/2000 | Izumi et al. |
| 6,131,013 A | 10/2000 | Bergstrom et al. |
| 6,151,352 A | 11/2000 | Taki et al. |
| 6,195,554 B1 | 2/2001 | H'mimy et al. |
| 6,212,221 B1 | 4/2001 | Wakayama et al. |
| 6,212,386 B1 | 4/2001 | Briere et al. |
| 6,230,026 B1 | 5/2001 | Schwaller et al. |
| 6,240,125 B1 | 5/2001 | Andersson et al. |
| 6,249,540 B1 | 6/2001 | Dicker et al. |
| 6,272,353 B1 | 8/2001 | Dicker et al. |
| 6,275,518 B1 | 8/2001 | Takahashi et al. |
| 6,292,494 B1 | 9/2001 | Baker et al. |
| 6,295,310 B1 | 9/2001 | Yamauchi et al. |
| 6,298,081 B1 | 10/2001 | Almgren et al. |
| 6,351,643 B1 | 2/2002 | Haartsen |
| 6,370,356 B2 | 4/2002 | Duplessis et al. |
| 6,377,609 B1 | 4/2002 | Brennan, Jr. |
| 6,389,000 B1 | 5/2002 | Jou |
| 6,400,751 B1 | 6/2002 | Rodgers |
| 6,418,317 B1 | 7/2002 | Cuffaro et al. |
| 6,434,183 B1 | 8/2002 | Kockmann et al. |
| 6,442,156 B1 | 8/2002 | Carlstrom |
| 6,466,793 B1 | 10/2002 | Wallstedt et al. |
| 6,480,721 B1 | 11/2002 | Sydon et al. |
| 6,487,392 B1 | 11/2002 | Sonetaka |
| 6,501,785 B1 | 12/2002 | Chang et al. |
| 6,519,460 B1 | 2/2003 | Haartsen |
| 6,526,279 B1 | 2/2003 | Dent |
| 6,574,266 B1 | 6/2003 | Haartsen |
| 6,577,611 B1 | 6/2003 | Tat et al. |
| 6,643,278 B1 | 11/2003 | Panasik et al. |
| 6,647,053 B1 | 11/2003 | Garces |
| 6,670,920 B1 | 12/2003 | Herrick |
| 6,694,141 B1 | 2/2004 | Pulkkinen et al. |
| 6,728,300 B1 | 4/2004 | Sarkar et al. |
| 6,751,249 B1 | 6/2004 | Cannon et al. |
| 6,760,319 B1 | 7/2004 | Gerten et al. |
| 6,807,227 B2 | 10/2004 | Chien |
| 6,934,315 B2 | 8/2005 | Suwa |
| 6,954,465 B2 | 10/2005 | Chang et al. |
| 6,961,363 B1 | 11/2005 | Anvekar et al. |
| 6,965,590 B1 | 11/2005 | Schmidl et al. |
| 6,970,495 B1 | 11/2005 | Schmidl et al. |
| 6,975,603 B1 | 12/2005 | Dicker et al. |
| 6,975,684 B1 | 12/2005 | Dabak et al. |
| 6,977,912 B1 | 12/2005 | Porter et al. |
| 7,006,451 B2 | 2/2006 | Kuwahara |
| 7,050,402 B2 | 5/2006 | Schmidl et al. |
| 7,050,479 B1 | 5/2006 | Kim |
| 7,068,702 B2 | 6/2006 | Chen et al. |
| 7,079,568 B1 | 7/2006 | Boetzel et al. |
| 7,103,030 B2 | 9/2006 | Jones |
| 7,151,767 B2 | 12/2006 | Spencer et al. |
| 7,158,493 B1 | 1/2007 | Uhlik et al. |
| 7,280,580 B1 | 10/2007 | Haartsen |
| 7,321,847 B1 | 1/2008 | Welkie et al. |
| 7,440,484 B2 | 10/2008 | Schmidl et al. |
| 7,519,106 B2 | 4/2009 | Sarkar et al. |
| 7,532,610 B2 | 5/2009 | Batra |
| 7,620,396 B2 * | 11/2009 | Floam et al. .................. 455/434 |
| 7,684,465 B1 | 3/2010 | Dabak et al. |
| 7,952,523 B2 | 5/2011 | Middour et al. |
| 2002/0122462 A1 | 9/2002 | Batra et al. |
| 2002/0191678 A1 | 12/2002 | Batra et al. |
| 2003/0054827 A1 | 3/2003 | Schmidl et al. |
| 2005/0078225 A1* | 4/2005 | Yen ............................. 348/732 |
| 2006/0178145 A1* | 8/2006 | Floam et al. .................. 455/434 |
| 2007/0032255 A1 | 2/2007 | Koo et al. |
| 2007/0053410 A1* | 3/2007 | Mahonen et al. ............. 375/130 |
| 2010/0184384 A1 | 7/2010 | Jones et al. |
| 2010/0184395 A1 | 7/2010 | Bagge et al. |
| 2010/0287588 A1 | 11/2010 | Cox et al. |
| 2014/0023118 A1 | 1/2014 | Gan et al. |

FOREIGN PATENT DOCUMENTS

| | | |
|---|---|---|
| EP | 0182762 A | 5/1986 |
| JP | 08-259443 | 9/1996 |
| JP | HEI 10-107693 | 9/1996 |
| JP | 8331012 A | 12/1996 |
| JP | 2002252573 A | 9/2002 |
| WO | WO9848586 A2 | 10/1998 |
| WO | WO 9909671 A | 2/1999 |
| WO | WO01/47308 A1 | 6/2001 |

OTHER PUBLICATIONS

Gan Treister, "Clause 14.3 Adaptive Frequency Hopping", IEEEP802.15 Wireless Personal Area Networks, dated Aug. 8, 2001, 25 pages.

Spaozhnykov V. et al., "Convergence of the Instant Channel Replacement Algorithm (ACL +SCO-HV2 Link)", IEEEP802.15 Wireless Personal Area Networks, dated Oct. 2001, 9 pages.

Treister N. et al., "Adaptive Frequency Hopping Classification", IEEEP802.15 Wireless Personal Are Networks, IEEE P802.15 Wireless Personal Area Networks, dated Nov. 8, 2001, 7 pages.

Arunachalam, Arun "Nov. 2001 TG2 minutes", IEEE P802.15 Wireless Personal Area Networks, dated Nov. 2001, 7 pages.

Arunachalam, Arun, "Jan. 2002 TG2 Minutes", IEEE P802.15 Wireless Personal Area Networks, Dated Jan. 2002, 7 pages.

Treister et al., "List of Change Request to 802.15.2 Draft", IEEE P802.15 Wireless Personal Area Networks, Dated Jan. 23, 2002, 4 pages.

Treister et al., "List of Change request to 802.15.2 Draft", IEEE P802.15 Wireless Personal Area Networks, Dated Jan. 23, 2002, 3 pages.

Marquess, Kevin, "TG 2—Coexistence Task Group (Portland Minutes)", IEEE P802.15 Wireless Personal Area Networks, Dated May 2001, 5 pages.

(56) References Cited

OTHER PUBLICATIONS

Gan H. et al., "Pseudo-code of new simple Adaptive Frequency Hopping (AFH) approach described in 01/435r0", IEEE P802.15 Wireless Personal Area Networks, Dated Sep. 2001, 4 pages.
Inprocomm et al., "Clause 14.3: Adaptive Frequency Hopping", IEEE P802.15 Wireless Personal Area Networks, Dated Nov. 2001, 13 pages.
Chen et al., "Comparison of TI-IPC's AFH Mechanism and Bandspeed's ICR Proposal", IEEE P802.15 Wireless Personal Area Networks, Dated Oct. 2001, 22 pages.
Spozhnykov et al., "Adaptive Frequency Hopping—Instant Channel Replacement: Simulation results", IEEE P802.15 Wireless Personal Area Networks, dated Oct. 2001, 9 pages.
Treister et al., "Non-Collaborative AFH Mechanism", IEEE P802.15 Wireless Personal Area Networks, Dated Jun. 14, 2001, 4 pages.
Shellhammer, Steve, "Letter to Coexistence Mechanism Submitters", IEEE P802.15 Wireless Personal Area Networks, dated Jan. 30, 2001, 5 pages.
Treister et al., "Adaptive Frequency Hopping ad-hoc group update", IEEE P802.15 Wireless Personal Area Networks, dated May 21, 2001, 15 pages.
The Institute of Electrial and Electronics Enginners, Inc., "Part 15.2 Coexistence of Wireless Personal Area Networks with Others Wireless Devices Operating in Unlicensed Frequency Bands", Dated Aug. 28, 2003, 126 pages.
Kim et al., "Multi-Adaptive FH Spread Spectrum System for Wireless High Data Rate Multimedia Services", IEEE, Dated 2000, 5 pages.
Chen et al. "Multicarrier CDMA with Adaptive Frequency Hopping for Mobile Radio Systems", IEEE Journal on Selected Areas in Communications, vol. 14, No. 9, dated Dec. 1996, 7 pages.
Marquess, Kevin, "TG 2—Coexistence Task Group", IEEE P802.15 Wireless Personal Area Networks, dated Mar. 15, 2001, 5 pages.
The Institute of Electrical and Electronics Enginners, Inc., "Instructions for the WG Chair", dated Mar. 25, 2008, 5 pages.
Wang et al. "Interference Avoidance and Power Control Strategies for Coded Frequency Hopped Cellular Systems", IEEE, dated 1995, 5 pages.
Homerf, "Interference Immunity of 2.4 GHz Wireless LANs", dated Jan. 2001, 10 pages.
Braun, Hans-Joachim "Advanced Weaponry of the Stars", American Heritage of Invention & Technology, vol. 12, Nov. 4, 9 pages.
Munday, P.J., "Jaguar-V Frequency-hopping radio system", Electronic Counter-Countermeasures, IEEE Proc., vol. 129, dated Jun. 3, 1982, 10 pages.
Symbol Technologies, "Letter to Coexistence Mechanism Submitters", IEEE P802.15 Wireless Personal Area Networks, dated Jan. 2001, 5 pages.
Bandspeed, "Non-Collaborative AFH Mechanism", IEEE P802.15 Wireless Personal Area Networks, dated Jun. 2001, 4 pages.
Kyocera, "Smartphone, Full Qwerty, Flip, Bar, Side Slide Swivel", http://kyocerawireless.com/phones/all.cfm, last accessed May 3, 2011, 3 pages.
The Institute of Electrial and Electronics Enginners, Inc., "Letter of Assurance for Essential Patent Claims", dated Jan. 17, 2008, 4 pages.
Zander J. "LPD Properties of Adaptive Frequency Hopping Systems for HF Communications", HF Radio Systems and Techniques, Jul. 1994, 4 pages.
Anderson, Gunnar, "LPI Performance of an Adaptive Frequency-Hopping System in an HF Interference Environment", Dated 1996, 5 pages.
Bandspeed Inc., "Adaptive Frequency Hopping ad-hoc group update", IEEE P.802.15 Wireless Personal Area Networks, dated May 2001, 15 pages.
Kallquist et al., "Adaptive Frequency Hopping in HF Environments", Minor Topics in Spread Spectrum Communications, Science and Art, dated Aug. 28, 1992, 18 pages.
Bluetooth, "Specification of the Bluetooth System", Specification vol. 1, Version 1.1, dated Feb. 22, 2001, 150 pages, (1 of 5).
Bluetooth, "Specification of the Bluetooth System", Specification vol. 1, Version 1.1, dated Feb. 22, 2001, 201 pages, (2 of 5).
Bluetooth, "Specification of the Bluetooth System", Specification vol. 1, Version 1.1, dated Feb. 22, 2001, 301 pages, (3 of 5).
Bluetooth, "Specification of the Bluetooth System", Specification vol. 1, Version 1.1, dated Feb. 22, 2001, 301 pages, (4 of 5).
Bluetooth, "Specification of the Bluetooth System", Specification vol. 1, Version 1.1, dated Feb. 22, 2001, 285 pages, (5 of 5).
Bluetooth, "Specification of the Bluetooth System", Specification vol. 1, dated Dec. 1, 1999, 200 pages, (1 of 5).
Bluetooth, "Specification of the Bluetooth System", Specification vol. 1, dated Dec. 1, 1999, 151 pages, (2 of 5).
Bluetooth, "Specification of the Bluetooth System", Specification vol. 1, dated Dec. 1, 1999, 301 pages, (3 of 5).
Bluetooth, "Specification of the Bluetooth System", Specification vol. 1, dated Dec. 1, 1999, 301 pages, (4 of 5).
Bluetooth, "Specification of the Bluetooth System", Specification vol. 1, dated Dec. 1, 1999, 277 pages, (5 of 5).
Bluetooth, "Specification of the Bluetooth System", The ad hoc Scatternet for affordable and highly functional wireless connectivity, Specification vol. 2, 200 pages, dated Jul. 26, 1999, (1 of 2).
Bluetooth, "Specification of the Bluetooth System", The ad hoc Scatternet for affordable and highly functional wireless connectivity, Specification vol. 2, 239 pages, dated Jul. 26, 1999, (2 of 2).
HomeRF, "HomeRF Specification" Revision 2.01, dated Jul. 1, 2002, 200 pages, (1 of 2).
HomeRF, "HomeRF Specification" Revision 2.01, dated Jul. 1, 2002, 327 pages, (2 of 2).
Bluetooth, "Specification of the Bluetooth System", Bluetooth Core Specification Addendum 1, dated Jun. 26, 2008, 75 pages, (1 of 2).
Bluetooth, "Specification of the Bluetooth System", Bluetooth Core Specification Addendum 1, dated Jun. 26, 2008, 99 pages, (2 of 2).
Bluetooth, "Specification of the Bluetooth System", Specification vol. 1, The ad hoc Scatternet for affordable and highly functional wireless connectivity, dated Jul. 26, 1999, 200 pages, (1 of 6).
Bluetooth, "Specification of the Bluetooth System", Specification vol. 1, The ad hoc Scatternet for affordable and highly functional wireless connectivity, dated Jul. 26, 1999, 201 pages, (2 of 6).
Bluetooth, "Specification of the Bluetooth System", Specification vol. 1, The ad hoc Scatternet for affordable and highly functional wireless connectivity, dated Jul. 26, 1999, 201 pages, (3 of 6).
Bluetooth, "Specification of the Bluetooth System", Specification vol. 1, The ad hoc Scatternet for affordable and highly functional wireless connectivity, dated Jul. 26, 1999, 201 pages, (4 of 6).
Bluetooth, "Specification of the Bluetooth System", Specification vol. 1, The ad hoc Scatternet for affordable and highly functional wireless connectivity, dated Jul. 26, 1999, 201 pages, (5 of 6).
Bluetooth, "Specification of the Bluetooth System", Specification vol. 1, The ad hoc Scatternet for affordable and highly functional wireless connectivity, dated Jul. 26, 1999, 263 pages, (6 of 6).
Bluetooth, "Specification of the Bluetooth System", Master Table of Contents & Compliance Requirements, Covered Core Package version: 4.0, Dated Jun. 30, 2010, 100 pages (1 out of 23).
Bluetooth, "Specification of the Bluetooth System", Master Table of Contents & Compliance Requirements, Covered Core Package version: 4.0, Dated Jun. 30, 2010, 75 pages (2 out of 23).
Bluetooth, "Specification of the Bluetooth System", Master Table of Contents & Compliance Requirements, Covered Core Package version: 4.0, Dated Jun. 30, 2010, 75 pages (3 out of 23).
Bluetooth, "Specification of the Bluetooth System", Master Table of Contents & Compliance Requirements, Covered Core Package version: 4.0, Dated Jun. 30, 2010, 100 pages (4 out of 23).
Bluetooth, "Specification of the Bluetooth System", Master Table of Contents & Compliance Requirements, Covered Core Package version: 4.0, Dated Jun. 30, 2010, 100 pages (5 out of 23).
Bluetooth, "Specification of the Bluetooth System", Master Table of Contents & Compliance Requirements, Covered Core Package version: 4.0, Dated Jun. 30, 2010, 100 pages (6 out of 23).
Bluetooth, "Specification of the Bluetooth System", Master Table of Contents & Compliance Requirements, Covered Core Package version: 4.0, Dated Jun. 30, 2010, 50 pages (7 out of 23).

(56) References Cited

OTHER PUBLICATIONS

Bluetooth, "Specification of the Bluetooth System", Master Table of Contents & Compliance Requirements, Covered Core Package version: 4.0, Dated Jun. 30, 2010, 50 pages (8 out of 23).
Bluetooth, "Specification of the Bluetooth System", Master Table of Contents & Compliance Requirements, Covered Core Package version: 4.0, Dated Jun. 30, 2010, 100 pages (9 out of 23).
Bluetooth, "Specification of the Bluetooth System", Master Table of Contents & Compliance Requirements, Covered Core Package version: 4.0, Dated Jun. 30, 2010, 101 pages (10 out of 23).
Bluetooth, "Specification of the Bluetooth System", Master Table of Contents & Compliance Requirements, Covered Core Package version: 4.0, Dated Jun. 30, 2010, 150 pages (11 out of 23).
Bluetooth, "Specification of the Bluetooth System", Master Table of Contents & Compliance Requirements, Covered Core Package version: 4.0, Dated Jun. 30, 2010, 151 pages (12 out of 23).
Bluetooth, "Specification of the Bluetooth System", Master Table of Contents & Compliance Requirements, Covered Core Package version: 4.0, Dated Jun. 30, 2010, 150 pages (13 out of 23).
Bluetooth, "Specification of the Bluetooth System", Master Table of Contents & Compliance Requirements, Covered Core Package version: 4.0, Dated Jun. 30, 2010, 100 pages (14 out of 23).
Bluetooth, "Specification of the Bluetooth System", Master Table of Contents & Compliance Requirements, Covered Core Package version: 4.0, Dated Jun. 30, 2010, 51 pages (15 out of 23).
Bluetooth, "Specification of the Bluetooth System", Master Table of Contents & Compliance Requirements, Covered Core Package version: 4.0, Dated Jun. 30, 2010, 50 pages (16 out of 23).
Bluetooth, "Specification of the Bluetooth System", Master Table of Contents & Compliance Requirements, Covered Core Package version: 4.0, Dated Jun. 30, 2010, 100 pages (17 out of 23).
Bluetooth, "Specification of the Bluetooth System", Master Table of Contents & Compliance Requirements, Covered Core Package version: 4.0, Dated Jun. 30, 2010, 50 pages (18 out of 23).
Bluetooth, "Specification of the Bluetooth System", Master Table of Contents & Compliance Requirements, Covered Core Package version: 4.0, Dated Jun. 30, 2010, 100 pages (19 out of 23).
Bluetooth, "Specification of the Bluetooth System", Master Table of Contents & Compliance Requirements, Covered Core Package version: 4.0, Dated Jun. 30, 2010, 125 pages (20 out of 23).
Bluetooth, "Specification of the Bluetooth System", Master Table of Contents & Compliance Requirements, Covered Core Package version: 4.0, Dated Jun. 30, 2010, 125 pages (21 out of 23).
Bluetooth, "Specification of the Bluetooth System", Master Table of Contents & Compliance Requirements, Covered Core Package version: 4.0, Dated Jun. 30, 2010, 148 pages (22 out of 23).
Bluetooth, "Specification of the Bluetooth System", Master Table of Contents & Compliance Requirements, Covered Core Package version: 4.0, Dated Jun. 30, 2010, 146 pages (23 out of 23).
Defendants Joint Invalidity Contentions, Exhibit A1, *Bandspeed, Inc v. Acer, Inc. et al.*, 2:10-CV-00215, Japanese Patent No. 10-107693, filed Sep. 30, 1996 to Hei, compared with U.S. Patent No. 7,027,418, 87 pages.
Defendants Joint Invalidity Contentions, Exhibit A2, *Bandspeed, Inc. v. Acer, Inc. et al.*, 2:10-CV-00215, U.S. Patent No. 6,275,518 compared with U.S. Patent No. 7,570,614, 423 pages.
Defendants Joint Invalidity Contentions, Exhibit A, *Bandspeed, Inc. v. Acer, Inc. et al.*, 2:10-CV-00215, U.S. Patent No. 5,937,002 compared with U.S. Patent No. 7,027,418, 220 pages.
Defendants Joint Invalidity Contentions, Exhibit B, *Bandspeed Inc. v. Acer, Inc. et al.*, 2:10-CV00215, Bark, Power Control in an LPI Adaptive Frequency-Hopping System for the HF Communications compared with U.S. Patent No. 7,027,418, 46 pages.
Defendants Joint Invalidity Contentions, Exhibit B1, *Bandspeed Inc. v. Acer, Inc. et al.*, 2:10-CV-00215, U.S. Patent No. 5,737,359, filed May 10, 1995 (Koivu '395) compared with U.S. Patent No. 7,027,418, 122 pages.
Defendants Joint Invalidity Contentions, Exhibit C, *Bandspeed Inc. v. Acer, Inc. et al.*, 2:10-CV00215, U.S. Patent No. U.S. 6,118,805 compared with U.S. Patent No. 7,027,418, 125 pages.

Defendants Joint Invalidity Contentions, Exhibit C1, *Bandspeed Inc. v. Acer, Inc. et al.*, 2:10-CV00215, U.S. Patent No. 7,280,580 filed Oct. 15, 19999 to Hartsen compared with U.S. Patent No. 7,027,418, 65 pages.
Defendants Joint Invalidity Contentions, Exhibit D, *Bandspeed Inc. v. Acer, Inc. et al.*, 2:10-CV00215, U.S. Patent No. 4,716,573 filed Nov. 8, 1985, to Bergstrom et al. compared with U.S. Patent No. 7,027,418, 87 pages.
Defendants Joint Invalidity Contentions, Exhibit D1, *Bandspeed Inc. v. Acer, Inc. et al.*, 2:10-CV00215, U.S. Patent No. 6, 052,594 filed Apr. 30, 1997 to Chuang et al. (the Chuang '594) compared with U.S. Patent No. 7,027,418, 4 pages.
Defendants Joint Invalidity Contentions, Exhibit D2, *Bandspeed Inc. v. Acer, Inc. et al.*, 2:10-CV00215, U.S. Patent No. 4,937,822 to Weddle et al. compared with U.S. Patent No. 7,570,614, 150 pages.
Defendants Joint Invalidity Contentions, Exhibit E, *Bandspeed Inc. v. Acer, Inc. et al.*, 2:10-CV00215, U.S. Patent No. 7,079,568, filed May 26, 2000 to Boetzel et al. compared with U.S. Patent No. 7,027,418, 56 pages.
Defendants Joint Invalidity Contentions, Exhibit E1, *Bandspeed Inc. v. Acer, Inc. et al.*, 2:10-CV00215, U.S. Patent No. 6,370,356 to ("Duplessis '356") and Canadian Patent Application 2,252,012 to Duplessis et al. ("Duplessis '012") compared with U.S. Patent No. 7,027,418, 3 pages.
Defendants Joint Invalidity Contentions, Exhibit E2, *Bandspeed Inc. v. Acer, Inc. et al.*, 2:10-CV00215, U.S. Patent No. 6,115,407 filed Apr. 3, 1998 to Gendel et al. compared with U.S. Patent No. 7,570,614, 86 pages.
Defendants Joint Invalidity Contentions, Exhibit F, *Bandspeed Inc. v. Acer, Inc. et al.*, 2:10-CV00215, U.S. Patent No. 6,751,249 filed Sep. 24, 1999 to Cannon et al. compared with U.S. Patent No. 7,027,418, 134 pages.
Defendants Joint Invalidity Contentions, Exhibit F1, *Bandspeed Inc. v. Acer, Inc. et al.*, 2:10-CV00215, Cuffaro '317 compared with U.S. Patent No. 7,027,418 ("The '418 patent"), 7 pages.
Defendants Joint Invalidity Contentions, Exhibit F2, *Bandspeed Inc. v. Acer, Inc. et al.*, 2:10-CV00215, Gillis '447 compared with U.S. Patent No. 7,570,614 (the 614 patent), 77 pages.
Defendants Joint Invalidity Contentions, Exhibit G, *Bandspeed Inc. v. Acer, Inc. et al.*, 2:10-CV00215, U.S. Patent No. 6,501,785 filed December with U.S. Patent No. 7,027,418, 165 pages.
Defendants Joint Invalidity Contentions, Exhibit G1, *Bandspeed Inc. v. Acer, Inc. et al.*, 2:10-CV00215, Larsson '642 compared with U.S. Patent No. 7, 027,418 ("the 418 patent"), 11 pages.
Defendants Joint Invalidity Contentions, Exhibit G2, *Bandspeed Inc. v. Acer, Inc. et al.*, 2:10-CV00215, Japanese Patent No. 10-107693, filed Sep. 30, 1996 to Hei compared with U.S. Patent No. 7,570,614, 44 pages.
Defendants Joint Invalidity Contentions, Exhibit H, *Bandspeed Inc. v. Acer, Inc. et al* 2:10-CV00215, U.S. Patent No. 7,684,465 to Dabak et al. compared with U.S. Patent No. 7,027,418, 378 pages.
Defendants Joint Invalidity Contentions, Exhibit H1, *Bandspeed Inc. v. Acer, Inc. et al.*, 2:10-CV00215, U.S. Patent No. 5,937,002 compared with U.S. Patent No. 7,570,614, 96 pages.
Defendants Joint Invalidity Contentions, Exhibit H2, *Bandspeed Inc. v. Acer, Inc. et al.*, 2:10-CV00215, U.S. Patent No. 5.737.359, filed May 10, 1995 ("Koivu '359") compared with U.S. Patent No. 7,570,614, 40 pages.
Defendants Joint Invalidity Contentions, Exhibit I, *Bandspeed Inc. v. Acer, Inc. et al.*, 2:10-CV00215, U.S. Patent No. 6,272,353 filed Aug. 20, 1999 to Dicker et al. compared with U.S. Patent No. 7,027,418, 157 pages.
Defendants Joint Invalidity Contentions, Exhibit J, *Bandspeed Inc. v. Acer, Inc. et al.*, 2:10-CV00215, U.S. Patent No. 6,975,603 filed Aug. 20, 1999 to Dicker et al. compared with U.S. Patent No. 7,027,418, 216 pages.
Defendants Joint Invalidity Contentions, Exhibit J1, *Bandspeed Inc. v. Acer, Inc. et al.*, 2:10-CV00215, U.S. Patent No. US 6,118,805 compared with U.S. Patent No. 7,570,614, 52 pages.
Defendants Joint Invalidity Contentions, Exhibit J2, *Bandspeed Inc. v. Acer, Inc. et al.*, 2:10-CV00215, U.S. Patent No. 6,487,392 compared with U.S. Patent No. 7,570,614, 8 pages.

(56) References Cited

OTHER PUBLICATIONS

Defendants Joint Invalidity Contentions, Exhibit K, *Bandspeed Inc. v. Acer, Inc. et al.*, 2:10-CV00215, U.S. Patent No. 6,249,540, filed Jul. 10, 1998 to Dicker et al. compared with U.S. Patent No. 7,027,418, 100 pages.
Defendants Joint Invalidity Contentions, Exhibit K1, *Bandspeed Inc. v. Acer, Inc. et al.*, 2:10-CV00215, U.S. Patent No. 4,716,573 filed Nov. 8, 1985, to Bergstrom et al. compared with U.S. Patent No. 7,570,614, 34 pages.
Defendants Joint Invalidity Contentions, Exhibit K2, *Bandspeed Inc. v. Acer, Inc. et al.*, 2:10-CV00215, U.S. Patent No. 4,937,822 to Weddle et al. compared with U.S. Patent No. 7,027,418, 300 pages.
Defendants Joint Invalidity Contentions, Exhibit L, *Bandspeed Inc. v. Acer, Inc. et al.*, 2:10-CV00215, U.S. Patent No. 6,760,319, filed Jul. 5, 2000 to Gerten et al. compared with U.S. Patent No. 7,027,418, 86 pages.
Defendants Joint Invalidity Contentions, Exhibit L1, *Bandspeed Inc. v. Acer, Inc. et al.*, 2:10-CV00215, U.S. Patent No. 7, 079,568, filed May 26, 2000 to Boetzel et al. compared with U.S. Patent No. 7,570,614, 23 pages.
Defendants Joint Invalidity Contentions, Exhibit M, *Bandspeed Inc. v. Acer, Inc. et al.*, 2:10-CV00215, Y. Kim, et al., "Multi-Adaptive FH Spread Spectrum System for Wireless High Data Rate Multimedia Services," IEEE 2000 compared with U.S. Patent No. 7,027,418, 76 pages.
Defendants Joint Invalidity Contentions, Exhibit M1, *Bandspeed Inc. v. Acer, Inc. et al.*, 2:10-CV00215, U.S. Patent No. 7,684, 465 to Dabak et al. compared with U.S. Patent No. 7,570,614, 176 pages.
Defendants Joint Invalidity Contentions, Exhibit N, *Bandspeed Inc. v. Acer, Inc. et al.*, 2:10-CV00215, U.S. Patent No. 7,050,479 filed May 12, 2000 to Kim compared with U.S. Patent No. 7,027,418, 100 pages.
Defendants Joint Invalidity Contentions, Exhibit N1, *Bandspeed Inc. v. Acer, Inc. et al.*, 2:10-CV00215, U.S. Patent No. 5,848,095 compared with U.S. Patent No. 7,570,614, 45 pages.
Defendants Joint Invalidity Contentions, Exhibit O, *Bandspeed Inc. v. Acer, Inc. et al.*, 2:10-CV00215, Kostic and Maric, Dynamic Frequency Hopping in Wireless Cellular Systems—Simulations of Full Replacement and Reduced-Overhead Models compared with U.S. Patent No. 7,027,418, 44 pages.
Defendants Joint Invalidity Contentions, Exhibit O1, *Bandspeed Inc. v. Acer, Inc. et al.*, 2:10-CV00215, U.S. Patent No. 6, 272,353 filed Aug. 20, 1999 to Dicker et al. compared with U.S. Patent No. 7,570,614, 82 pages.
Defendants Joint Invalidity Contentions, Exhibit P, *Bandspeed Inc. v. Acer, Inc. et al.*, 2:10-CV00215, U.S. Patent Publication No. 2003/0054827, filed Jul. 25, 2001, to Schmidl compared with U.S. Patent No. 7,027,418, 242 pages.
Defendants Joint Invalidity Contentions, Exhibit P1, *Bandspeed Inc. v. Acer, Inc. et al.*, 2:10-CV00215, U.S. Patent No. 6,249,540 filed Jul. 10, 1998 to Dicker et al. compared with U.S. Patent No. 7,570,614, 38 pages.
Defendants Joint Invalidity Contentions, Exhibit Q, *Bandspeed Inc. v. Acer, Inc. et al.*, 2:10-CV00215, U.S. Patent No. 6, 965,590 filed Jul. 7, 2000 to Schmidl et al. compared with U.S. Patent No. 7,027,7418, 107 pages.
Defendants Joint Invalidity Contentions, Exhibit Q1, *Bandspeed Inc. v. Acer, Inc. et al.*, 2:10-CV00215, U.S. Patent No. 6,760,319 filed Jul. 5, 2000 to Gerten et al. compared with U.S. Patent No. 7,570,614, 32 pages.
Defendants Joint Invalidity Contentions, Exhibit R, *Bandspeed Inc. v. Acer, Inc. et al.*, 2:10-CV00215, U.S. Patent No. 7,440,484 filed Apr. 19, 2001 to Schmidl et al., compared with U.S. Patent No. 7,027,418, 120 pages.
Defendants Joint Invalidity Contentions, Exhibit R1, *Bandspeed Inc. v. Acer, Inc. et al.*, 2:10-CV00215, Y. Kim, et al., "Multi-Adaptive FH Spread Spectrum System for Wireless High Data Rate Multimedia Services," IEEE 2000 compared with U.S. Patent No. 7,570,614, 30 pages.
Defendants Joint Invalidity Contentions, Exhibit S, *Bandspeed Inc. v. Acer, Inc. et al.*, 2:10-CV00215, PCT Application PCT/IB99/02085 filed Dec. 22, 1999 to Sivakumar compared with U.S. Patent No. 7,027,418, 66 pages.
Defendants Joint Invalidity Contentions, Exhibit S1, *Bandspeed Inc. v. Acer, Inc. et al.*, 2:10-CV00215, U.S. Patent No. 7,050,479 filed May 12, 2000 to Kim compared with U.S. Patent No. 7,570,614, 42 pages.
Defendants Joint Invalidity Contentions, Exhibit T, *Bandspeed Inc. v. Acer, Inc. et al.*, 2:10-CV00215, Stranneby and Kallquist, Adaptive Frequency Hopping in HF Environments compared with U.S. Patent No. 7,027,418, 45 pages.
Defendants Joint Invalidity Contentions, Exhibit T1, *Bandspeed Inc. v. Acer, Inc. et al.*, 2:10-CV00215, Kostic and Maric, Dynamic Frequency Hopping in Wireless Cellular Systems—Simulations of Full-Replacement and Reduced-Overhead Models compared with U.S. Patent No. 7,570,614, 18 pages.
Defendants Joint Invalidity Contentions, Exhibit U, *Bandspeed Inc. v. Acer, Inc. et al.*, 2:10-CV00215, U.S. Patent No. 6,480,721 filed Jul. 10, 1998 to Sydon et al. compared with U.S. Patent No. 7,027,418, 97 pages.
Defendants Joint Invalidity Contentions, Exhibit U1, *Bandspeed Inc. v. Acer, Inc. et al.*, 2:10-CV00215, U.S. Patent Publication No. 2003/0054827, filed Jul. 25, 2001 to Schmidl compared with U.S. Patent No. 7,570,614, 99 pages.
Defendants Joint Invalidity Contentions, Exhibit V, *Bandspeed Inc. v. Acer, Inc. et al.*, 2:10-CV00215, U.S. Patent No. 6,275,518 compared with U.S. Patent No. 7,027418, 910 pages.
Defendants Joint Invalidity Contentions, Exhibit W, *Bandspeed Inc. v. Acer, Inc. et al.*, 2:10-CV00215, Specification of the Bluetooth System, Specification vol. 1.0B, Dec. 1, 1999 compared with US. Patent No. 7,027, 7,570,614, 5 pages.
Defendants Joint Invalidity Contentions, Exhibit W1, *Bandspeed Inc. v. Acer, Inc. et al.*, 2:10-CV00215, U.S. Patent No. 7,440,484 filed Apr. 19, 2001 to Schmidl et al. compared with U.S. Patent No. 7,570,614, 67 pages.
Defendants Joint Invalidity Contentions, Exhibit X, *Bandspeed Inc. v. Acer, Inc. et al.*, 2:10-CV00215, U.S. Patent No. 5,726,978 filed Jun. 22, 1995 to Frodigh, et al. compared with U.S. Patent No. 7,027,418, 104 pages.
Defendants Joint Invalidity Contentions, Exhibit X1, *Bandspeed Inc. v. Acer, Inc. et al.*, 2:10-CV00215, PCT Application PCT/IB99/02085 filed Dec. 22, 1999 to Sivakumar compared with U.S. Patent No. 7,570,614, 56 pages.
Defendants Joint Invalidity Contentions, Exhibit Y, *Bandspeed Inc. v. Acer, Inc. et al.*, 2:10-CV00215, U.S. Patent No. 6,115,407 filed Apr. 3, 1998 to Gendel et al. compared with U.S. Patent No. 7,027,418, 200 pages.
Defendants Joint Invalidity Contentions, Exhibit Y1, *Bandspeed Inc. v. Acer, Inc. et al.*, 2:10-CV00215, Stranneby and Kallquist, 'Adaptive Frequency Hopping in HF Environments compared with U.S. Patent No. 7,570,614, 19 pages.
Defendants Joint Invalidity Contentions, Exhibit Z, *Bandspeed Inc. v. Acer, Inc. et al.*, 2:10-CV00215, Gillis '447 compared with U.S. Patent No. 7,027,418 ("the '418 patent"), 140 pages.
Defendants Joint Invalidity Contentions, Exhibit Z1, *Bandspeed Inc. v. Acer, Inc. et al.*, 2:10-CV00215, U.S. Patent No. 6,480,721 filed Jul. 10, 1998 to Sydon et al. compared with U.S. Patent No. 7,570,614, 38 pages.
Bandspeed Inc., "Adaptive Frequency Hopping, a Non-collaborative Coexistence Mechanism" Project: IEEE P802.15 Working Group for Wireless Personal Area Networks (WPANs), Dated May 16, 2001, 25 pages.
Batra et al., "Proposal for Intelligent BT Frequency Hopping for Enchanced Coexistence", Project: IEEE P802.15 Working Group for Wireless Personal Area Networks (WPANs), Dated Jan. 15, 2001, 13 pages.
Bluetooth, "Bluetooth Technology: The True Hollywood Story", Internet website, http://www.bluetooth.com/English/Press/Pages/PressReleasesDetail.aspx?ID=30, last visited Apr. 13, 2010, 1 page.
Bluetooth, "Bluetooth Specification, 4.5 Payload Format", Version 1.0B, Dated Nov. 29, 1999, 7 pages.

(56) References Cited

OTHER PUBLICATIONS

Braun, Hans-Joachin, "Advanced Weaponry of the Starts", American Heritage of Invention & Technology Magazine, vol. 12 No. 4, 1997, 9 pages.

Chen et al., "Selective Hopping for Hit Avoidance", Project: IEEE P802.15 Working Group for Wireless Personal Area Networks (WPANs), Integrated Programmable Communications, Inc., Dated Jan. 15, 2001, 17 pages.

Gan et al., "Adaptive Frequency Hopping Ad-hoc Group Update" Bandspeed Inc., Project: IEEE P802.15 Working Group for Wireless Personal Area Networks (WPANs), Dates May 16, 2001, 14 pages.

Gan et al., "Adaptive Frequency Hopping, Implementation Proposals for IEEE", Bandspeed Ltd., Dated Nov. 2000, 28 pages.

Gan et al., "Adaptive Frequency Hopping, a Non-collaborative Coexistence Mechanism", Project: IEEE P802.15 Working Group for Wireless Personal Area Networks (WPANs), Bandspeed Inc., Dated Mar. 12, 2001, 40 pages.

Gan et al., "Fundamentals of Adaptive Frequency Hopping", Project: IEEE P802.15 Working Group for Wireless Personal Area Networks (WPANs), Bandspeed Inc., Dated Mar. 27, 2001, 4 pages.

Hills, "Terrestrial Wireless Networks", Scientific American Magazine, Dated Apr. 1998, 9 pages.

HomeRF, "Interference Immunity of 2.4 GHz Wireless LANs", Dated Jan. 8, 2001, 10 pages.

HomeRF, "HomeRF Specification HomeRF", Revision 2.01, Dated Jul. 1, 2002, 526 pages.

Hughes et al, "Spread Spectrum Radio", Scientific American Magazine, vol. 278, No. 4, Dated Apr. 1998, 6 pages.

IEEE, "Letter to Coexistence Mechanism Submitters", IEEE P802.15 Working Group for Wireless Personal Area Networks (WPANs), Dated Jan. 29, 2001, 5 pages.

IEEE, "Non-Collaborative AFH Mechanism", IEEE P802.15 Working Group for Wireless Personal Area Networks (WPANs), Dated Jun. 15, 2001, 4 pages.

IEEE, "Adaptive Frequency Hopping Ad-Hoc Group Update", IEEE P802.15 Working Group for Wireless Personal Area Networks (WPANs), Dates May 10, 2001, 15 pages.

Kostic et al., "Dynamic Frequency Hopping in Wireless Cellular Stystems Simulations of Full-Replacement and Reduced-Overhead Methods", Dated 1999, 5 pages.

Sapozhnykov et al., "Adaptive Frequency Hopping—Instant Channel Replacement: Simulation results", Project: IEEE P802.15 Working Group for Wireless Personal Area Networks (WPANs), Dated Oct. 31, 2001, 9 pages.

Bluetooth, "Specification of the Bluetooth System" Specification vol. 1, Dated Dec. 1, 1999, 4 pages.

Wenner, "Hedy Lamarr: Not Just a Pretty Face", Internet website Scientific American, http://www.scientificamerican.com/article.cfm?id=hedy-lamarr-not-just-a-pr, Dated Jun. 3, 2008, 3 pages.

Zander, "Adaptive Frequency Hopping in HF Communications", IEE Proc-Commun., vol. 142, No. 2, Dated Apr. 2, 1995, 99 pages.

United States District Court for the Western District of Texas Austin Division, Joint Invalidity Contentions, *Bandspeed, Inc.* vs. *Sony Electronics Inc. and Cambridge Silicon Radio Limited*, Civil Action No. A-09-CA-593-LY, 24 pages, dated Jul. 16, 2010.

Defendants Joint Invalidity Contentions, Exhibit A, *Bandspeed, Inc.* v. *Sony Electronics Inc.*, No. A-09-CA-593-LY, U.S. Patent No. 5,323, 447, Filed Nov. 1, 1991 to Gillis et al., 137 pages.

Defendants Joint Invalidity Contentions, Exhibit A2, *Bandspeed, Inc.* v. *Sony Electronics Inc.*, No. A-09-CA-593-LY, U.S. Patent No. 5,323, 447, Filed Nov. 1, 1991 to Gillis et al., 70 pages.

Defendants Joint Invalidity Contentions, Exhibit B1, *Bandspeed, Inc.* v. *Sony Electronics Inc.*, No. A-09-CA-593-LY, U.S. Patent No. 7,440,484 filed Apr. 19, 2001 to Schmidl et al., 79 pages.

Defendants Joint Invalidity Contentions, Exhibit B2, *Bandspeed, Inc.* v. *Sony Electronics Inc.*, No. A-09-CA-593-LY, U.S. Patent No. 7,440,484 filed Apr. 19, 2001 to Schmidl et al., 67 pages.

Defendants Joint Invalidity Contentions, Exhibit C1, *Bandspeed, Inc.* v. *Sony Electronics Inc.*, No. A-09-CA-593-LY, U.S. Patent No. 6,272,353 filed Aug. 20, 1999 to Dicker et al.,122 pages.

Defendants Joint Invalidity Contentions, Exhibit C2, *Bandspeed, Inc.* v. *Sony Electronics Inc.*, No. A-09-CA-593-LY, U.S. Patent No. 6,272,353 filed Aug. 20, 1999 to Dicker et al., 74 pages.

Defendants Joint Invalidity Contentions, Exhibit D1, *Bandspeed, Inc.* v. *Sony Electronics Inc.*, No. A-09-CA-593-LY, U.S. Patent No. 6,760,319 filed Jul. 5, 2000 to Gerten et al., 72 pages.

Defendants Joint Invalidity Contentions, Exhibit D2, *Bandspeed, Inc.* v. *Sony Electronics Inc.*, No. A-09-CA-593-LY, U.S. Patent No. 6,760,319 filed Jul. 5, 2000 to Gerten et al., 32 pages.

Defendants Joint Invalidity Contentions, Exhibit E1, *Bandspeed, Inc.* v. *Sony Electronics Inc.*, No. A-09-CA-593-LY, U.S. Patent No. 6,115,407, filed Apr. 3, 1998 to Gendel et al., 104 pages.

Defendants Joint Invalidity Contentions, Exhibit E2, *Bandspeed, Inc.* v. *Sony Electronics Inc.*, No. A-09-CA-593-LY, U.S. Patent No. 6,115,407, filed Apr. 3, 1998 to Gendel et al., 68 pages.

Defendants Joint Invalidity Contentions, Exhibit F1, *Bandspeed, Inc.* v. *Sony Electronics Inc.*, No. A-09-CA-593-LY, U.S. Patent No. 5,937,002 filed Jun. 13, 1995 to Andersson et al., 152 pages.

Defendants Joint Invalidity Contentions, Exhibit F2, *Bandspeed, Inc.* v. *Sony Electronics Inc.*, No. A-09-CA-593-LY, U.S. Patent No. 5,937,002 filed Jun. 13, 1995 to Andersson et al., 86 pages.

Defendants Joint Invalidity Contentions, Exhibit G1, *Bandspeed, Inc.* v. *Sony Electronics Inc.*, No. A-09-CA-593-LY, Japanese No. 10-107693, filed Sep. 30, 1996 to Hei, 66 pages.

Defendants Joint Invalidity Contentions, Exhibit G2, *Bandspeed, Inc.* v. *Sony Electronics Inc.*, No. A-09-CA-593-LY, Japanese No. 10-107693, filed Sep. 30, 1996 to Hei, 34 pages.

Defendants Joint Invalidity Contentions, Exhibit H1, *Bandspeed, Inc.* v. *Sony Electronics Inc.*, No. A-09-CA-593-LY, U.S. Patent No. 7,050,479, filed May 12, 2000 to Kim, 74 pages.

Defendants Joint Invalidity Contentions, Exhibit H2, *Bandspeed, Inc.* v. *Sony Electronics Inc.*, No. A-09-CA-593-LY, U.S. Patent No. 7,050,479, filed May 12, 2000 to Kim, 32 pages.

Defendants Joint Invalidity Contentions, Exhibit I1, *Bandspeed, Inc.* v. *Sony Electronics Inc.*, No. A-09-CA-593-LY, U.S. Patent No. 5,737,359 filed May 10, 1995 to Koivu, 78 pages.

Defendants Joint Invalidity Contentions, Exhibit I2, *Bandspeed, Inc.* v. *Sony Electronics Inc.*, No. A-09-CA-593-LY, U.S. Patent No. 5,737,359 filed Apr. 7, 1998 to Koivu, 44 pages.

Defendants Joint Invalidity Contentions, Exhibit J1, *Bandspeed, Inc.* v. *Sony Electronics Inc.*, No. A-09-CA-593-LY, U.S. Patent No. 7,280,580, filed Oct. 15, 1999 to Haartsen, 62 pages.

Defendants Joint Invalidity Contentions, Exhibit J2, *Bandspeed, Inc.* v. *Sony Electronics Inc.*, No. A-09-CA-593-LY, U.S. Patent No. 7,280,580, filed Oct. 15, 1999 to Haartsen, 26 pages.

Defendants Joint Invalidity Contentions, Exhibit K1, *Bandspeed, Inc.* v. *Sony Electronics Inc.*, No. A-09-CA-593-LY, U.S. Patent No. 7,079,568 filed May 26, 2000 (priority) to Boetzel et al., 43 pages.

Defendants Joint Invalidity Contentions, Exhibit K2, *Bandspeed, Inc.* v. *Sony Electronics Inc.*, No. A-09-CA-593-LY, U.S. Patent No. 7,079,568 filed May 26, 2000 (priority) to Boetzel et al., 20 pages.

Defendants Joint Invalidity Contentions, Exhibit L1, *Bandspeed, Inc.* v. *Sony Electronics Inc.*, No. A-09-CA-593-LY, U.S. Patent No. 4,716,573 filed Nov. 8, 1995 to Bergstrom et al., 42 pages.

Defendants Joint Invalidity Contentions, Exhibit L2, *Bandspeed, Inc.* v. *Sony Electronics Inc.*, No. A-09-CA-593-LY, U.S. Patent No. 4,716,573 filed Nov. 8, 1995 to Bergstrom et al., 20 pages.

Defendants Joint Invalidity Contentions, Exhibit M, *Bandspeed, Inc.* v. *Sony Electronics Inc.*, No. A-09-CA-593-LY, U.S. Patent No. 5,848,095 filed May 17, 1996 to Deutsch, 30 pages.

Defendants Joint Invalidity Contentions, Exhibit N, *Bandspeed, Inc.* v. *Sony Electronics Inc.*, No. A-09-CA-593-LY, Specification of the Bluetooth System, Specification vol. 1.0b, Dec. 1, 1999, 2 pages.

Defendants Joint Invalidity Contentions, Exhibit O, *Banspeed, Inc.* v. *Sony Electronics Inc.*, No. A-09-CA-593-LY, U.S. Patent No. 6,965,590 filed Jul. 7, 2000 to Schmidl et al., 10 pages.

Defendants Joint Invalidity Contentions, Exhibit P, *Bandspeed, Inc.* v. *Sony Electronics Inc.*, No. A-09-CA-593-LY, Kistic, et al., "Dynamic Frequency Hopping in Wireless Cellular Systems-Simulations of Full Replacement and Reduced Overhead Methods", IEEE Published May 1999, 12 pages.

(56) References Cited

OTHER PUBLICATIONS

Defendants Joint Invalidity Contentions, Exhibit Q, *Bandspeed, Inc. v. Sony Electronics Inc.*, No. A-09-CA-593-LY, U.S. Patent No. 5,956,642 filed Nov. 25, 1996 to Larsson et al., 10 pages.

Defendants Joint Invalidity Contentions, Exhibit R, *Bandspeed, Inc. v. Sony Electronics Inc.*, No. A-09-CA-593-LY, U.S. Patent No. 6,418,317 filed Dec. 1, 1999 to Cuffaro et al, 5 pages.

Defendants Joint Invalidity Contentions, Exhibit S, *Bandspeed, Inc. v. Sony Electronics Inc.*, No. A-09-CA-593-LY, U.S. Patent No. 6,052,594 filed Apr. 30, 1997 to Chuang et al., 4 pages.

Defendants Joint Invalidity Contentions, Exhibit T, *Bandspeed, Inc. v. Sony Electronics Inc.*, No. A-09-CA-593-LY, U.S. Patent No. 6,370,356 filed Oct. 19, 1998 to Duplessis et al., 2 pages.

Defendants Joint Invalidity Contentions, Exhibit U, *Bandspeed, Inc. v. Sony Electronics Inc.*, No. A-09-CA-593-LY, U.S. Patent No. 6,487,392 filed Dec. 6, 1999 to Sonetaka, 6 pages.

Doany P. et al. "Theoretical Performance of an Adaptive Frequency-Hopping Modem at HF", IEEE Proceedings, vol. 133, No. 5, Dated Aug. 1986, 6 pages.

Colin et al., "Tradeoffs in Concatenated Coding for Frequency-Hop Packet Radio with Partial-Band Interference", IEEE, dated 1992, 5 pages.

Shellhammer, et al., "Tutorial on 802.15.2 Draft", Dated Mar. 2002, 29 pages.

Google, "John Morten Malerbakken" View Profile, Dated Aug. 15, 2000, 3 pages.

USPTO Patent Full-Text and Image Database, "United States Patent Haartsen", Dated Oct. 9, 2007, 20 pages.

Siemens, "Wholesale Price and Specs for Siemens 2.4GHz Cordless Phones", Http://www/nordsudtt.com/g1054.htm, last accessed May 27, 2011, 8 pages.

Mobilian Corporation, "Wi-Fi (802.11b) and Bluetooth, An Examination of Coexistence Approaches", dated 2001, 25 pages.

Gifford, Ian, "IEEE 802.15.1 TGI Minutes Session #11/Hilton Head Island", IEEE 802.15 Wireless Personal Area Networks, dated Jun. 6, 2001, 13 pages.

Request for Inter Partes Reexamination of U.S Patent 7,570614, "Identification of Patent and Claims for Which Reexamination is Requested" dated Aug. 29, 2012, 175 pages.

Request for Inter Partes Reexamination of U.S Patent 7,570614, "Identification of Claims for Which Reexamination is Requested" Exhibit C through Q, dated Aug. 29, 2012, 128 pages.

Canadian Intellectual Property Office, "Office Action" in application No. 2,506,253, dated May 31, 2013, 3 pages.

Current Claims in Canadian application No. 2,506,253 dated May 2013, 5 pages.

Wikipedia, "Frequency-hopping Spread Spectrum" http://en.wikipedia.org/wiki/Frequency-hopping_spread_spectrum, last accessed Jun. 25, 2013, 5 pages.

Wikipedia, "Hedy Lamarr", http://en.wikipedia.org/wiki/Hedy_Lamarr, last accessed Jun. 25, 2013, 5 pages.

Kobayashi et al., "Spatially Divided Channel Scheme" IEEE, 2000, 6 pages.

Chen et al. "Multi-Carrier DS-CDMA with Adaptive Sub-Carrier Hopping for Fading Channels", IEEE, Dated 1995, 5 pages.

Pursley et al., "Network Protocols for Frequency-Hop Packet Radios with Decoder Side Information", IEEE Journal on Selected Areas in Communications, vol. 12 No. 4, dated May 1994, 10 pages.

Sapozhnykov et al., "Adaptive Frequency Hopping-Instant Channel Replacement: Simulations results", IEEE P802.15 Working Group for Wireless Personal Area Networks (WPANs), dated Oct. 2001, 9 pages.

Pursley, Michael, "Packet Error Probabilities in Frequency-Hop Radio Networks—Coping with Statistical Dependence and Noisy Side Information", IEEE, Dated 1986, 6 pages.

Bark G., "Performance Comparison of Spread-Spectrum Methods on an Interference-Limited HF Channel", IEEE vol. 146 No. 1, dated 1999, 6 pages.

Wong et al., "Performance of Adaptive Frequency Hopping Modem on an HF Link", IEEE Proceedings vol. 137, Pt. 1, No. 6 Dec. 1990, 8 pages.

Andersson, Gunnar, "Performance of Speed-Spectrum Radio Techniques in an Interference-Limited HF Environment", IEEE, dated 1995, 5 pages.

Bark, Gunnar "Power Control and Active Channel Selection in an LPI FH System for HF Communications", Dated 1997, 5 pages.

Bark, G., "Power Control in an LPI Adaptive Frequency-Hopping System for HF Communications", HF Radio Systems and Techniques, Dated Jul. 1997, 5 pages.

Treister et al., "Adaptive Frequency Hopping Ad-hoc group update", Project: IEEE P802.15 Working Group for Wireless Personal Area Networks (WPANs), dated May 2001, 14 pages.

Gan et al., "Merged AFH Proposal", Project: IEEE P802.15 Working Group for Wireless Personal Area Networks (WPANs), dated Aug. 7, 2001, 14 pages.

Bandspeed, "Why Use of Bad Channels Should Be Optional", Project: IEEE P802.15 Working Group for Wireless Personal Area Networks (WPANs), dated Nov. 2001, 6 pages.

Bandspeed, "Why Bad Channels Should be Used in the Adapted Hop Sequence", Project: IEEE P802.15 Working Group for Wireless Personal Area Networks (WPANs)., dated Jun. 24, 2011, 14 pages.

Bandspeed, "Why Use of Bad Channels Should be Optional", Project: IEEE P802.15 Working Group for Wireless Personal Area Networks (WPANs), dated Jun. 24, 2011, 6 pages.

Yc Maa et al., "A Wise AFH Solution for WPAN", Project: IEEE P802.15 Working Group for Wireless Personal Area Networks (WPANs), dated Nov. 2001, 32 pages.

Integrated Programmable Communications, Inc, "Request for Clarification of Discrepancies between Doc. 01/435 and TG2-Adopted AFH Mechanism", dated Oct. 2001, 12 pages.

Bandspeed, "Adaptive Frequency Hopping, a Non-collaborative Coexistence Mechanism", Project: IEEE P802.15 Working Group for Wireless Personal Area Networks (WPANs), dated May 2001, 25 pages.

Integrated Programmable Communications, Inc, "Selective Hopping for Hit Avoidance", Project: IEEE P802.15 Working Group for Wireless Personal Area Networks (WPANs), dated Jan. 15, 2001, 17 pages.

Gan et al., "Adaptive Frequency Hopping, a Non-collaborative Coexistence Mechanism", Project: IEEE P802.15 Working Group for Wireless Personal Area Networks (WPANs), Dated Mar. 2001, 40 pages.

Gan et al., "Fundamentals of Adaptive Frequency Hopping", Project: IEEE P802.15 Working Group for Wireless Personal Area Networks (WPANs), Dated Mar. 27, 2001, 4 pages.

Integrated Programmable Communications, Inc., "Merged IPC and TIPC and TI Adaptive Frequency Hopping Proposal", Project:IEEE P802.15 Working Group for Wireless Personal Area Networks (WPANs), Dated May 14, 2001, 47 pages.

Batra et al. "Proposal for Intelligent BF Frequency Hopping for Enhanced Coexistence", Project: IEEE P802.15 Working Group for Wireless Personal Area Networks (WPANs), Dated Jan. 2001, 13 pages.

Gan et al., "Adaptive Frequency Hopping—An instant channel replacement approach", Project: IEEE P802.15 Working Group for Wireless Personal Area Networks (WPANs), dated Sep. 2001, 64 pages.

Siemens, "The Cordless Digital DECT Telephone System Expandable to 6 Handsets", Operating Instructions, dated 1998, 71 pages.

Gan et al., "Adaptive Frequency Hopping—An instant channel replacement approach for both ACL and SCO Links", Project: IEEE P802.15 Working Group for Wireless Personal Area Networks (WPANs), dated Sep. 2001, 21 pages.

Gan et al., "Adaptive Frequency Hopping—An instant channel replacement approach for both ACL and SCO Links", Project: IEEE P802.15 Working Group for Wireless Personal Area Networks (WPANs), Dated Sep. 2001, 23 pages.

Bandspeed, Adaptive Frequency Hopping, a Non-collaborative Coexistence Mechanism, Project: IEEE P802.15 Working Group for Wireless Personal Area Networks (WPANs), Dated May 2001, 25 pages.

(56) References Cited

OTHER PUBLICATIONS

Negus et al., "Protocol Packs Wireless Voice, Data", WayBackMachine website, http://web.archive.org/web/19991115145417/http://www.techweb.com/se/directlink.cgi?E, dated Oct. 5, 1998, 3 pages.

Lefriec, Oliver, "Recent Press Releases", Alcated to supply Wireless Local Systems to China, Dated Nov. 25, 1999, 10 pages.

ETSI/PT 12, "Multiplexing and Multiple Access on the Radio Path", GSM Recommendation 05.02, Version 3.8.0, dated Dec. 1995, 37 pages.

ETSI/PT 12, "European Digital Cellular Telecommunication System (phase 1)", Physical Layer on the Radio Path: General Description, ETSI, Dated 1992, 16 pages.

Pursley et al., "Routing in Frequency-Hop Packet Radio Networks with Partial-Band Jamming", IEEE Transactions on Communications, vol. 41 No. 7. Dated Jul. 1993, 8 pages.

Kyocera, "Sanyo Cell Phones, Mobile Phones, Wireless Phones,", Http://kyocerawireless.com/sanyo/usa/all.cfm, dated May 3, 2011, 2 pages.

Hughes et al., "Spread Spectrum Radio", Scientific American, vol. 278, No. 4, Dated Apr. 1998, 6 pages.

Hills Alex, "Terrestrial Wireless Networks", Scientific American, vol. 278, No. 4, dated Apr. 1998, 13 pages.

Siemens, "System User Manual for the Gigaset 2402", Communication Devices, Dated May 1999, 54 pages.

Siemens, "Gigaset2415 Cordless Telephone System with Answering Machine", Owner's Manual, dated 1999, 36 pages.

Siemens, "2415 Answering Machine Quick Reference Guide", 4 pages.

Siemens, "2415 Quick Start Guide", 4 Basic Steps for Getting Started, 6 pages.

Siemens, "Gigaset 2410 Cordless Telephone System with Answering Machine", Owner's Manual, Dated Sep. 1999, 64 pages.

Richardson, "New Cordless Technology Platform Features Multi-user Capabilities, Superior Voice Quality and Highest-level of Integrated Functionally", Siemens Develops Cordless Communication System for U.S. SOHO Market, http://www.thefreelibrary.com/Slemens+Develops+First+Communication+System+for+U.S.+SOHO+ . . . dated, Jul. 13, 1998, 6 pages.

Simens, "Gigaset 2400 Handset and Charger Quick Reference Guide", Dated Jul. 1999, 4 pages.

Siemens ICM, "New Releases", http://web.archive.org/web/20020414121l/http://www.icm.siemens.com/press/2001.html, last accessed May 25, 2011, 16 pages.

Siemens ICM, "New Releases 1998", http://web.archive.org/web/20020414115710/http://icm.siemens.com/press/1998.html, last accessed May 25, 2011, 1 page.

Siemens ICM, "J&R Music World/Computer World Now Offering the First Complete 2.4 GHz Cordless Communication System", http://web.archive,org/web/20020414213336/http://www.icm.siemens.com/press/1998/12_15.html, dated Dec. 15, 1998, 2 pages.

Business Wire, "Siemens New Gigaset 2.4 GHz Cordless Product Provides Unmatched Cordless Capabilities for Growing Multi-cordless Market" http://www/thefreelibrary.com/Siemens+New+Gigaset+2.4.+GHz+Cordless+Product+Provides+Unmatched, Dated Jan. 7, 1999, 5 pages.

Richardson, "Siemens Secures Additional Distributors for its New 2.4 GHz Cordless Communication System", Dated Nov. 18, 1998, 2 pages.

Siemens, "System User Manual for the Gigaset 2420", Siemens Communication Devices, dated Jul. 1999, 100 pages.

Siemens, "Residential Domestic Cordless Phones", dated 2000, 47 pages.

Kyocera, "Kyocera Cell Phones", http://replay.web.archive.org/20060411203708/http://tools.kyocera-wireless.com/phoneshowcase.do, lasted accessed May 3, 2011, 5 pages.

Pottie, Gregory, "Systems Design Choices in Personal Communications", Improving the Capacity of TDMA and CDMA Cellular Radio Systems, IEEE Personal Communications, Dated Oct. 1995, 18 pages.

Brown, Graham, "The Answer to the WLAN vs 36 Argument", Wireless World Forum Posted Thursday Feb. 14, 2002, 8 pages.

Siemens, "The Cordless Digital DECT Telephone System for Up to 6 Handsets with Integrated Answering Machine", Gigaset 2015 Plus, Operating Instructions, dated 1998, 88 pages.

Bluetooth, "Specification of the Bluetooth System", Master Table of Contents & Compliance Requirements, Covered Core Package version: 3.0 + HS, dated Apr. 21, 2009, 150 pages, (1 out of 7).

Bluetooth, "Specification of the Bluetooth System", Master Table of Contents & Compliance Requirements, Covered Core Package version: 3.0 + HS, dated Apr. 21, 2009, 150 pages, (2 out of 7).

Bluetooth, "Specification of the Bluetooth System", Master Table of Contents & Compliance Requirements, Covered Core Package version: 3.0 + HS, dated Apr. 21, 2009, 250 pages, (3 out of 7).

Bluetooth, "Specification of the Bluetooth System", Master Table of Contents & Compliance Requirements, Covered Core Package version: 3.0 + HS, dated Apr. 21, 2009, 250 pages, (4 out of 7).

Bluetooth, "Specification of the Bluetooth System", Master Table of Contents & Compliance Requirements, Covered Core Package version: 3.0 + HS, dated Apr. 21, 2009, 250 pages, (5 out of 7).

Bluetooth, "Specification of the Bluetooth System", Master Table of Contents & Compliance Requirements, Covered Core Package version: 3.0 + HS, dated Apr. 21, 2009, 125 pages, (6 out of 7).

Bluetooth, "Specification of the Bluetooth System", Master Table of Contents & Compliance Requirements, Covered Core Package version: 3.0 + HS, dated Apr. 21, 2009, 125 pages, (7 out of 9).

Bluetooth, "Specification of the Bluetooth System", Master Table of Contents & Compliance Requirements, Covered Core Package version: 3.0 + HS, dated Apr. 21, 2009, 250 pages, (8 out of 9).

Bluetooth, "Specification of the Bluetooth System", Master Table of Contents & Compliance Requirements, Covered Core Package version: 3.0 + HS, dated Apr. 21, 2009, 156 pages, (9 out of 9).

Bluetooth, "Specification of the Bluetooth System", Wireless connections made easy, Master Table of Contents & Compliance Requirements, Covered Core Package version:1.2, dated Nov. 5, 2003, 250 pages (1 out of 5).

Bluetooth, "Specification of the Bluetooth System", Wireless connections made easy, Master Table of Contents & Compliance Requirements, Covered Core Package version:1.2, dated Nov. 5, 2003, 250 pages (2 out of 5).

Bluetooth, "Specification of the Bluetooth System", Wireless connections made easy, Master Table of Contents & Compliance Requirements, Covered Core Package version:1.2, dated Nov. 5, 2003, 250 pages (3 out of 5).

Bluetooth, "Specification of the Bluetooth System", Wireless connections made easy, Master Table of Contents & Compliance Requirements, Covered Core Package version:1.2, dated Nov. 5, 2003, 250 pages (4 out of 5).

Bluetooth, "Specification of the Bluetooth System", Wireless connections made easy, Master Table of Contents & Compliance Requirements, Covered Core Package version:1.2, dated Nov. 5, 2003, 195 pages (5 out of 5).

Bluetooth, "Specification of the Bluetooth System", Wireless connections made easy, Version 1.1, Dated Feb. 22, 2001, 250 pages (1 out of 4).

Bluetooth, "Specification of the Bluetooth System", Wireless connections made easy, Version 1.1, Dated Feb. 22, 2001, 250 pages (2 out of 4).

Bluetooth, "Specification of the Bluetooth System", Wireless connections made easy, Version 1.1, Dated Feb. 22, 2001, 250 pages (3 out of 4).

Bluetooth, "Specification of the Bluetooth System", Wireless connections made easy, Version 1.1, Dated Feb. 22, 2001, 329 pages (4 out of 4).

Bluetooth, "Specification of the Bluetooth System", Wireless Connections made easy, Master Table of Contents & Compliance Requirements, Covered Core Package Version. Dated Nov. 4, 2004, 250 pages (1 out of 5).

(56) References Cited

OTHER PUBLICATIONS

Bluetooth, "Specification of the Bluetooth System", Wireless Connections made easy, Master Table of Contents & Compliance Requirements, Covered Core Package Version. Dated Nov. 4, 2004, 250 pages (2 out of 5).
Bluetooth, "Specification of the Bluetooth System", Wireless Connections made easy, Master Table of Contents & Compliance Requirements, Covered Core Package Version. Dated Nov. 4, 2004, 250 pages (3 out of 5).
Bluetooth, "Specification of the Bluetooth System", Wireless Connections made easy, Master Table of Contents & Compliance Requirements, Covered Core Package Version. Dated Nov. 4, 2004, 250 pages (4 out of 5).
Bluetooth, "Specification of the Bluetooth System", Wireless Connections made easy, Master Table of Contents & Compliance Requirements, Covered Core Package Version. Dated Nov. 4, 2004, 226 pages (5 out of 5).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 150, (1 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 142, (2 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 146 pages (3 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 146 pages (4 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 292 pages (5 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 292 pages (6 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (1 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 50 pages (2 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (3 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (4 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (5 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 148 pages (6 out of 6).
IEEE P802.15 Personal Area Networks, "Clause 14.3 Adaptive Frequency Hopping", dated Jul. 17, 2001, 26 pages.
IEEE 802.15, "Adaptive Frequency Hopping Implantation Proposals for IEEE 802.15.1/2 WPAN", 28 pages, dated Nov. 2000.
Pursley et al. "A Comparison of Two Methods for Erasure Generation in Frequency-Hop Communications with Partial-Band Interference and Rayleigh Fading", 5 pages, dated 1996.
Correia et al., "Adaptive Frequency-Hopping for TDMA/CDMA with Joint Detection", 5 pages, dated 1998.
Gan et al. "IEEE, Adaptive Frequency Hopping Implementation Proposals for IEEE 802.15 WPAN", 28 pages, dated Nov. 2000.
Zander et al. "Adaptive Frequency Hopping in HF Communications", dated Apr. 1995, 7 pages.
Stranneby et al., "Adaptive Frequency Hopping in HF Environments", dated 1993, 4 pages.
Sabbagh et al. "Adaptive Slow Frequency-Hopping System for Land Mobile Radio", IEE Proceedings vol. 132, Pt. F, No. 5. Dated Aug. 1985, 9 pages.
Young-Hwan et al. "Adaptive Timing Synchronization Schemes for a Short-Ranged Bluetooth Systems", IEEE Transactions on Consumer Electronics, vol. 46, No. 3, Aug. 2000, 7 pages.
MacDonald, "Adjacent-Cell Interference in Direct-Sequence CDMA Forward Traffic Channels", International Journal of Wireless Information Networks, vol. 7, No. 4, 2000, dated 2000, 10 pages.
Jackson et al., "Advanced HF Anti-Jam Network Architecture", dated 1990, 5 pages.
Kim et al., "An Efficient Distributed, Dynamic Traffic Control in a Frequency Hopping CDMA System", IEEE, dated 1992, 5 pages.
Barclay Enterprises Inc., "Siemens Cordless Phone Repair Siemens Cordless Telephone for Sale", http://www.barclayent.com/Cordless/siemenscordless.htm, last accessed May 27, 2011, 6 pages.
Baum et al., "Bayesian Methods for Erasure Insertion in Frequency-Hop Communication Systems with Partial-Band Interference", IEEE Transactions on Communications, vol. 40 No. 7, Jul. 1992, 8 pages.
Bluetooth, "Search for Kyocera Wireless Corp", http://www.bluetooth.com/Pages/Productlisting.aspx?Searchtext+&ProductCategory=08&Manufacture=Kyocera+Wireless+Corp., last accessed Apr. 28, 2011, 2 pages.
Haartsen et al. "Bluetooth a New Radio Interface Providing Ubiquitous Connectivity", IEEE, Dated 2000, 5 pages.

(56) References Cited

OTHER PUBLICATIONS

Bluetooth Developers Conference, "Attendance sheet and notes from Conference", www://webcache.googleusercontent.com/search?...2bandspeed,+Inc.%22+formerly+known+as&ct=clnk (1of 17), last accessed Jan. 24, 2011, 17 pages.
Sizer, Todd, "Bluetooth SIG Coexistence Working Group", Bell Laboratories, IEEE, dated Nov. 2000, 16 pages.
Sizer, Todd, "Blue SIG Coexistence Working Group", Liaison Report, IEEE, dated Jan. 2001, 10 pages.
Bandspeed Inc., "Non-Collaborative AFH Mechanism", IEEE P802.15 Wireless Personal Area Networks, Dated Jul. 7, 2001, 18 pages.
Bandspeed Inc., "Overview of Coexistence Mechanisms", IEEE P802.15 Wireless Personal Area Networks, Dated Jul. 12, 2001, 4 pages.
Chen KC et al., "TG2 Draft Text for Clause14.3 for TG2 Coexixtence Mechanisms", IEEE P802.15 Wireless Personal Area Networks, Dates Jul. 12, 2001, 31 pages.
Chen KC et al., "Clause 14.3 Adaptive Frequency Hopping", IEEE P802.15 Wireless Personal Area Networks, Dated Jul. 12, 2001, 26 pages.
Iwami, Masaaki, "Certified Translation", dates Jun. 25, 2010, 1 page.
Bluetooth, "Technology: The True Hollywood Story", http://bluetooth.com/English/Press/Pages/PressReleasesDetail.aspx?ID=30, last accessed Apr. 13, 2010, 1 page.
Microsoft Press, "Computer Dictionary" Third Edition, Dated 1997, 4 pages.
Cai, Khiem et al., "Continuously Available Net Entry Synchronization Technique", IEEE, Dated 1990, 5 pages.
Bluetooth, "Core Specification Version 1.2", Compliance Requirements, 3 pages.
Yuen et al., "Direct Memory Access Frequency Synthesizer for Channel Efficiency Improvement in Frequency Hopping Communication", IEEE International Symposium on Circuits and Systems, dates May 28-31, 2000, 4 pages.
Kostic et al. "Dynamic Frequency Hopping in Wireless Cellular Systems-Simulations of Full-Replacement and Reduced-Overhead Methods", IEEE, Dated 1999, 5 pages.
Kostic et al., "Dynamic Frequency Hopping in Cellular Systems With Network Assisted Resource Allocation", IEEE, Dated 2000, 5 pages.
Kostic, et al., "Dynamic Frequency Hopping for Limited-Bandwidth Cellular Systems", IEEE, Dated 2000, 8 pages.
Baum et al., "Erasure Insertion in Frequency-Hop Communications with Fading and Partial-Band Interference", IEEE Transactions on Vehicular Technology, vol. 46, No. 4, dated Nov. 1997, 8 pages.
Deb et al., "Error Avoidance in Wireless Networks Using Link State History", IEEE INFOCOM dated 2001, 10 pages.
Internet Archive, Wayback Machine, "Kyocera Cell Phones, Flip Phones", http://replay.web.archive.org/20081217013144/http://tools.kyocera-wireless.com/phoneshowcase.do, last accessed May 3, 2011, 4 pages.
Borth et. al, "Frequency Hopped Systems for PCS", Motorola Inc., 10 pages.
Chayat Naftali, "Frequency Hopping Spread Spectrum PHY of the 802.11 Wireless LAN Standard", doc.:IEEE P802.11-96-49D, dated Mar. 1996, 11 pages.
Anvekar et al., "Frequency Look and Link State History Based Interference Avoidance in Wireless Pico-cellular Networks", IEEE, Dated 2000, 5 pages.
Gigaset, "Gigaset 3000 Comfort, Operating Instruction and Safety Precautions", 27 pages.
Gigaset, "Siemens Gigaset 3000 Classic", dated 2008, 22 pages.
Gigaset, "Quick Start Installation", Gigaset 2402.book Seite iii Diens tag, dated Jul. 6, 1999, 92 pages.
Siemens, "System User Manual, Gigaset 2420", Preliminary Version 3, Dated Jul. 1998, 82 pages.
Internet Machine Wayback Machine, "Take-Your-Entire-CD-Collection-Anywhere Music Player", Hammacher Schlemmer, http://www.hammacher.com./h_and_o/houndex.htm, last accessed May 26, 2011, 4 pages.
Lamarr Hedy, "Not Just a Pretty Face", Scientific American, http://www/scientificamerican.com/article.cfm?id=hedy-lamarr-not-just-a-pr, dated Jun. 3, 2008, 3 pages.
Bluetooth, "Specification of the Bluetooth System" Wireless connections made easy, Host Controller Interface, vol. 4, Dated Jan. 1, 2006, 74 pages.
Stevenson, Carl, "IEEE 802 Wireless Network Standards Development", Joint AHCIET-CITEL Broadband Wireless Access Seminar, Dated Oct. 2003, 23 pages.
IEEE, "IEEE-SA Patent Licensing Policy", IEEE 802.16-01/39, dated Jul. 7, 2001, 5 pages.
Godfrey, Tim, "IEEE P802.11 Wireless LANs", Approved Minutes of the IEEE P802.11 Full Working Group, dated Jan. 2003, 187 pages.
Godfrey, Tim, "IEEE P802.11 Wireless LANs", Approved Minutes of the IEEE P802.11 Full Working Group, dated Nov. 2001, 155 pages.
IEEE, "Submissions", dated Jan. 2001, 4 pages.
Shellhamer, Steve, IEEE 802.15 Task Group (Coxistence):, Dated Mar. 2001, 12 pages.
Trister, Bijan "Adaptive Frequency Hopping ad-hoc group update", IEEEP802.15 Wireless Personal Area Networks, dated Jul. 8, 2010, 15 pages.
Heile, Robert, "IEEE802.15 WG Minutes", IEEEP802.15 Wireless Personal Area Networks, Dated Mar. 27, 2002, 14 pages.
Marquess, Kevin, "TG 2—Coexistence Task Group", IEEE P802.15 Wireless Personal Area Networks, dated May 2001, 6 pages.
United Stated District Court for the Western District of Texas Austin Division, "Original Complaint", Case 1:14-cv-00433-SS Document 1 Filed May 9, 2014, *Broadcom Corporation* vs. *Bandspeed*, 13 pages.
United Stated District Court for the Western District of Texas Austin Division, "Original Complaint", Case 1:14-cv-00434-SS Document 1 Filed May 9, 2014, *Broadcom Corporation* vs. *Marvell Semiconductor*, 13 pages.
United Stated District Court for the Western District of Texas Austin Division, "Original Complaint", Case 1:14-cv-00435-SS Document 1 Filed May 9, 2014, *Broadcom Corporation* vs. *Mediatek Inc. and Mediatek USA, Inc.*, 13 pages.
United Stated District Court for the Western District of Texas Austin Division, "Original Complaint", Case 1:14-cv-00436-SS Document 1 Filed May 9, 2014, *Broadcom Corporation* vs. *Qualcomm Incorporated, Qualcomm Atheros, Inc. and Qualcomm Innovation Center Inc.*, 14 pages.
United Stated District Court for the Western District of Texas Austin Division, "Original Complaint", Case 1:14-cv-00437-SS Document 1 Filed May 9, 2014, Stmicroelectronics N.V. and Stmicroelectronics Inc.12 pages.
United Stated District Court for the Western District of Texas Austin Division, "Original Complaint", Case 1:14-cv-00438-SS Document 1 Filed May 9, 2014, Texas Instruments Incorporated, 13 pages.

* cited by examiner

INTEGRATED CIRCUIT FOR SIGNAL ANALYSIS

CROSS-REFERENCE TO RELATED APPLICATIONS; BENEFIT CLAIM

This application claims benefit as a Continuation-in-part of application Ser. No. 12/357,307, filed Jan. 21, 2009, entitled "Adaptive Channel Scanning For Detection and Classification Of RF Signals," the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

This invention relates generally to radio frequency signal analysis.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

In many wireless communications applications, the available RF band is broken up into channels. For example, the 802.11g band is segmented into 14 channels (depending on the regulatory domain) which, theoretically, allows for at least three, non-overlapping channels of 20 MHz bandwidth, and thus three simultaneous non-interfering wireless links.

To exploit channelization of the band, most RF transceivers are designed for best performance (e.g. noise, linearity, interference rejection) in a single or perhaps a pair of channels. One frequently-used architecture for low-cost RF transceivers is shown in FIG. 1 (receiver only).

This so-called direct conversion receiver has an RF bandwidth that covers multiple channels. In the case of 802.11g, RF bandwidth covers approximately 2.4 GHz to 2.5 GHz. An antenna 102 receives the signal. A front-end bandpass filter (BPF) 104 limits the RF band signal. The band-limited RF signal is amplified by a low-noise amplifier (LNA) 106 prior to a frequency shift to a baseband (BB) frequency using a mixer 110 receiving input from synthesizer 108. The final bandwidth of the receiver is defined by a pair of lowpass filters (BB LPF) 112. The baseband signal is further amplified by a variable-gain amplifier (VGA) 114. Control signals 116 can be applied to one or more of the LNA 106, synthesizer 108, BB LPF 112 and VGA 114 to adjust performance.

For the architecture illustrated in FIG. 1, the receiver's front-end RF bandwidth is set to cover the entire available band, while the BB bandwidth is set to cover (typically) one channel only. In an RF monitoring or scanning scenario, the entire RF bandwidth needs to be analyzed. Consequently, the receiver must scan the channels in some way, dwelling on a channel for some specified amount of time. Typically, the scanning would take place as shown in FIG. 2.

For simplicity, the channels are shown to be disjoint with no gaps between them. Also for simplicity, the time to complete a channel change is assumed to be zero. The dwell time in each channel is the same.

In the channel configuration illustrated in the drawings, five channels are required to cover the RF band. Consequently, when the dwell time in each channel is the same, the duty factor for analysis in each channel is 1/5. Continuous scanning would be accomplished by repeating the channel sequence.

If there is no a priori indication of a signal-of-interest (SOI), specifically no knowledge of what channel in the band that the SOI would be likely to occur, then the scanning shown in FIG. 2 would be adequate.

If a SOI is suspected to occupy one or more channels more frequently than others, then the scanning shown in FIG. 2 could be modified to dwell on the more likely channel(s) for a longer period of time. Dwelling on a more likely channel for a longer period of time provides more opportunities to observe the signal (for example, a pulsed signal) and/or better estimation of signal features due to a longer observation time.

Examples are shown in FIGS. 3 and 4. FIG. 3 shows a scanning protocol that dwells longer on channel C2 and shorter on C3. FIG. 4 shows non-sequential channel scanning in which the scanning sequence is {C0, C1, C0, C2, C4, C3}.

The proliferation of Wi-Fi enabled devices can be traced back to the first 802.11 standards promulgated by the Institute of Electrical and Electronics Engineers (IEEE) in 1997. Consumers are probably most familiar with devices using the 802.11b and 802.11g standards that operate in the Industrial Scientific Medical (ISM) frequency band located around 2.4 GHz. These devices are susceptible to interference from other devices, such as Bluetooth-enabled devices, microwave ovens, cordless telephones, and baby monitors.

As newer 802.11 standards, such as 802.11n, enter the marketplace, devices operating under the newer standards may be expected to 'play well with others' on frequency bands that are increasingly congested with signals from other 802.11 devices, as well as the devices lacking any type of 802.11 protocol but whose signals share the frequency bands, such as microwave ovens and cordless communication devices such as baby monitors.

In other non-consumer-based applications, it may be important to discern a signal of interest (SOI) from a signal that may contain both noise from various sources and other signals, in a signal environment susceptible to interference from both consumer devices, as well as from industrial signals, such as radar pulses and wireless local area network communications.

BRIEF DESCRIPTION OF THE DRAWINGS

In the figures of the accompanying drawings like reference numerals refer to similar elements.

DETAILED DESCRIPTION

CONTENTS
I. EXAMPLE ARCHITECTURE
II. EXAMPLE PROCESS FLOWS
III. EXAMPLE SIGNAL ANALYSIS DATA FLOW
IV. EXAMPLE SIGNAL ANALYSIS INTEGRATED CIRCUIT ARCHITECTURE
   A. Components Connected to Main Bus (Other Than Signal Analyzer)
   B. Signal Analyzer
V. IMPLEMENTATION MECHANISMS In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described below.

According to one aspect of the invention, a method for monitoring communications channels comprises: determining performance data for a plurality of communications channels during a first monitoring period, wherein a particular communications channel from the plurality of communications channels is monitored for a first amount of time during the first monitoring period; determining, based upon the performance data, that the particular communications channel includes a signal of interest; in response to determining, based upon the performance data, that the particular communications channel includes the signal of interest, determining a second amount of time for monitoring the particular communications channel, wherein the second amount of time is greater than the first amount of time; and during a second monitoring period that occurs after the first monitoring period, monitoring the particular communications channel for the second amount of time.

According to one aspect of the invention, an integrated circuit for signal analysis comprises: a bus; one or more integrated processors connected to the bus, and a signal analyzer connected to the bus. The signal analyzer includes a time-domain analyzer and a frequency domain analyzer. The one or more integrated processors perform adaptive scanning based upon input provided by the signal analyzer. The one or more integrated processors also perform automatic classification algorithms.

I. Example Architecture

Figure 5:
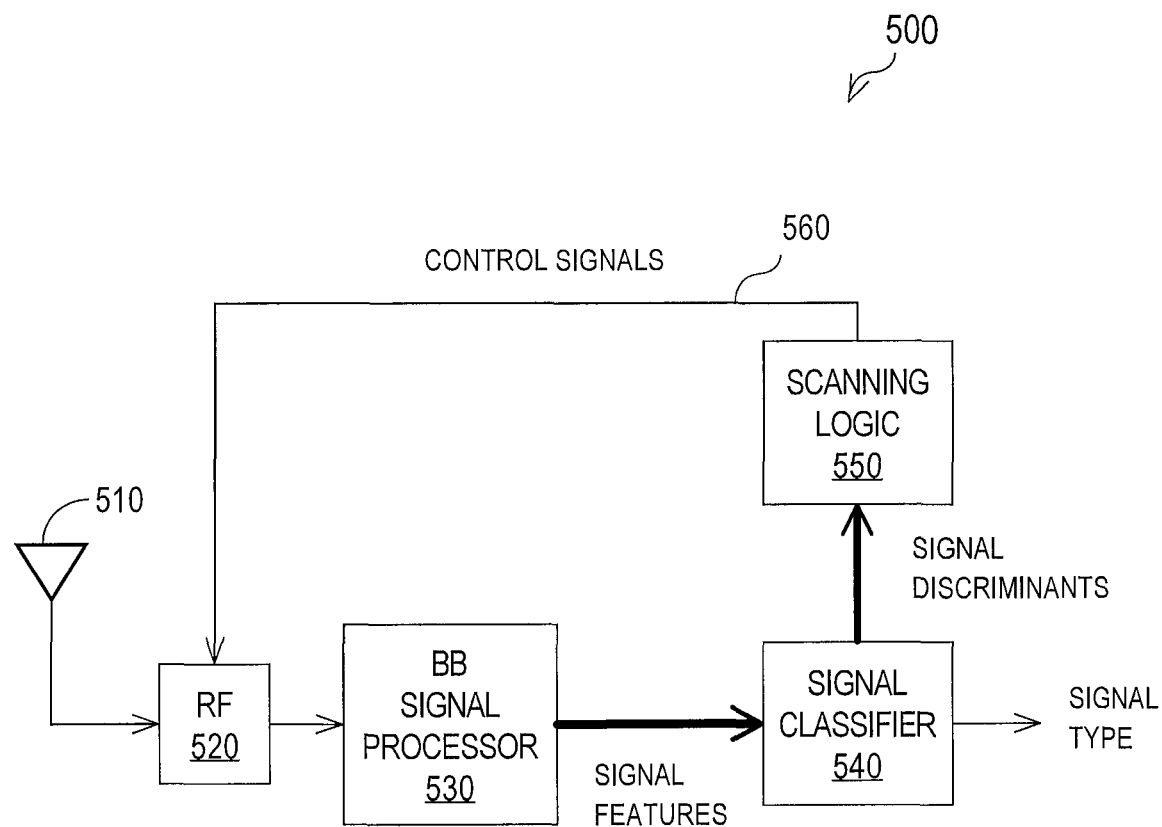
FIG. 5 is a schematic diagram of an embodiment of an adaptive channel scanner.

FIG. 5 is a schematic diagram of an embodiment of adaptive channel scanner 500. An input RF signal is received by antenna 510, and the input signal is converted to a baseband signal by RF module 520. As described below, RF module 520 also receives one or more control signals 560 that control the band frequency and duration of the radio signal collected. The collected signal is further processed in baseband (BB) signal processor 530.

In an embodiment, baseband signal processor 530 digitizes the collected signal. In an embodiment, baseband signal processor 530 performs a fast Fourier transform (FFT) on the collected signal data. In an embodiment, baseband signal processor 530 applies windows to the collected signal data in order to reduce spectral leakage that may occur in an FFT of a sampled finite-duration signal.

In an embodiment, baseband signal processor 530 obtains time-domain signal information that may include one or more of the following features:
(i) duration (such as the length of time a signal is present);
(ii) time-domain power (such as the strength of the signal);
(iii) timestamp (such as the time a particular event occurred);
(iv) correlation (such as a similarity measure of the signal to either another measured signal or a signal model);
(v) pulse-repetition interval (PRI) (such as the period between pulse repetitions in a multi-pulse signal); and
(vi) pulse count (such as the number of pulses in a burst of a multi-pulse signal).

In an embodiment, baseband signal processor 530 obtains frequency-domain signal information that may include or more of the following features:
(i) bandwidth (such as the frequency-span occupied by the signal, and analogous to duration in the time-domain);
(ii) center frequency (such as the frequency occupied by the signal such that equal bandwidth lies on each side);
(iii) peak magnitude frequency (such as the frequency corresponding to the peak signal power or power spectral density (PSD) or collected energy); and
(iv) power spectral density (PSD) (such as the power at each frequency per unit of frequency, in units of power per bandwidth, e. g. dBm/MHz).

The quantities described above are merely illustrative, with variations possible depending on the type of information desired. For example, a measure of the center frequency could incorporate statistical definitions such as mean, median, or mode.

After processing by baseband signal processor 530, the resulting signal features are passed to signal classifier 540 for classification. Example classification methods that may be performed by signal classifier 540 are further described below with respect to FIGS. 6-8.

Signal discriminants output by signal classifier 540 are received by scanning logic 550. In an embodiment, signal type information is also displayed to a user or processed by other logic (not shown in FIG. 5). The scanning logic 550, also further described below, generates and sends control signals 560 back to RF module 520, forming a control loop and resulting in an adaptive channel scanner.

II. Example Process Flows

The following processes can be implemented in hardware, software, or any combination of hardware and software. For example, theses processes could be implemented in an ASIC. However, at least some of the blocks in these processes could be implemented by executing instructions on a processor. These blocks in the following processes are discussed in a particular order as a matter of convenience to facilitate explanation. The processes are not limited to the order in which the blocks are discussed or depicted in the figures.

Figure 6:
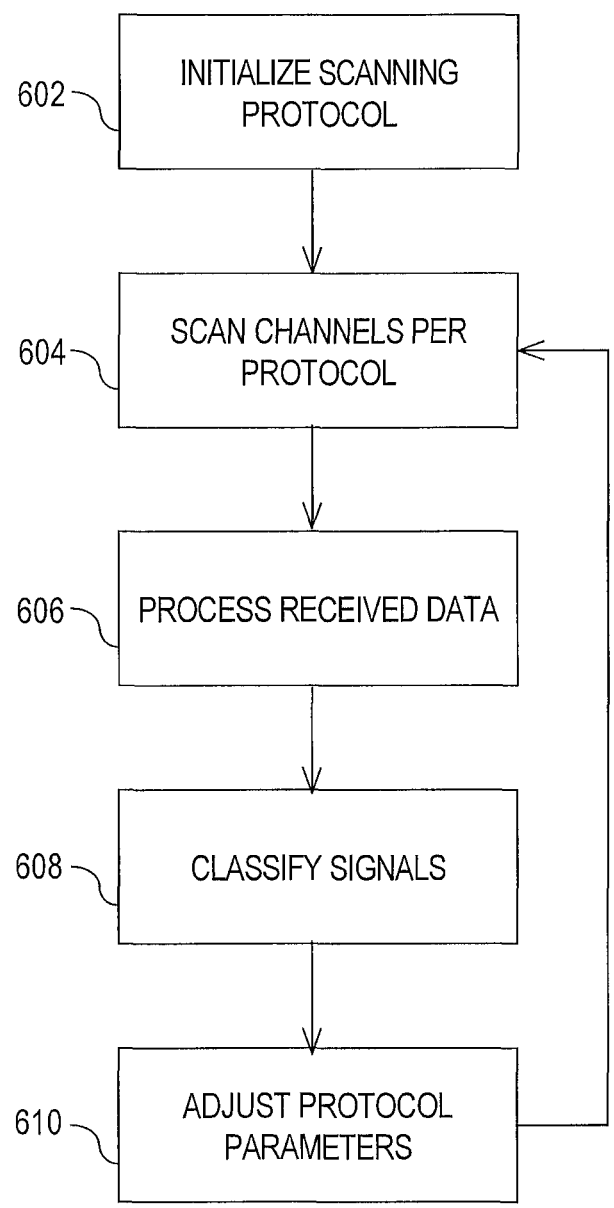
FIG. 6 is an example process flow of the steps performed by the adaptive channel scanner using an adaptive scanning protocol.

FIG. 6 is an example process flow of steps performed by the adaptive channel scanner using an adaptive scanning protocol. While this non-limiting, illustrative example of the adaptive scanning protocol primarily will focus on the two parameters of dwell time and scanning order, the adaptive scanning protocol should not be considered as limited to these two parameters. For example, the protocol could additionally include parameters representing the size of the RF band and the segmentation of the bandwidth into channels.

Figure 1:
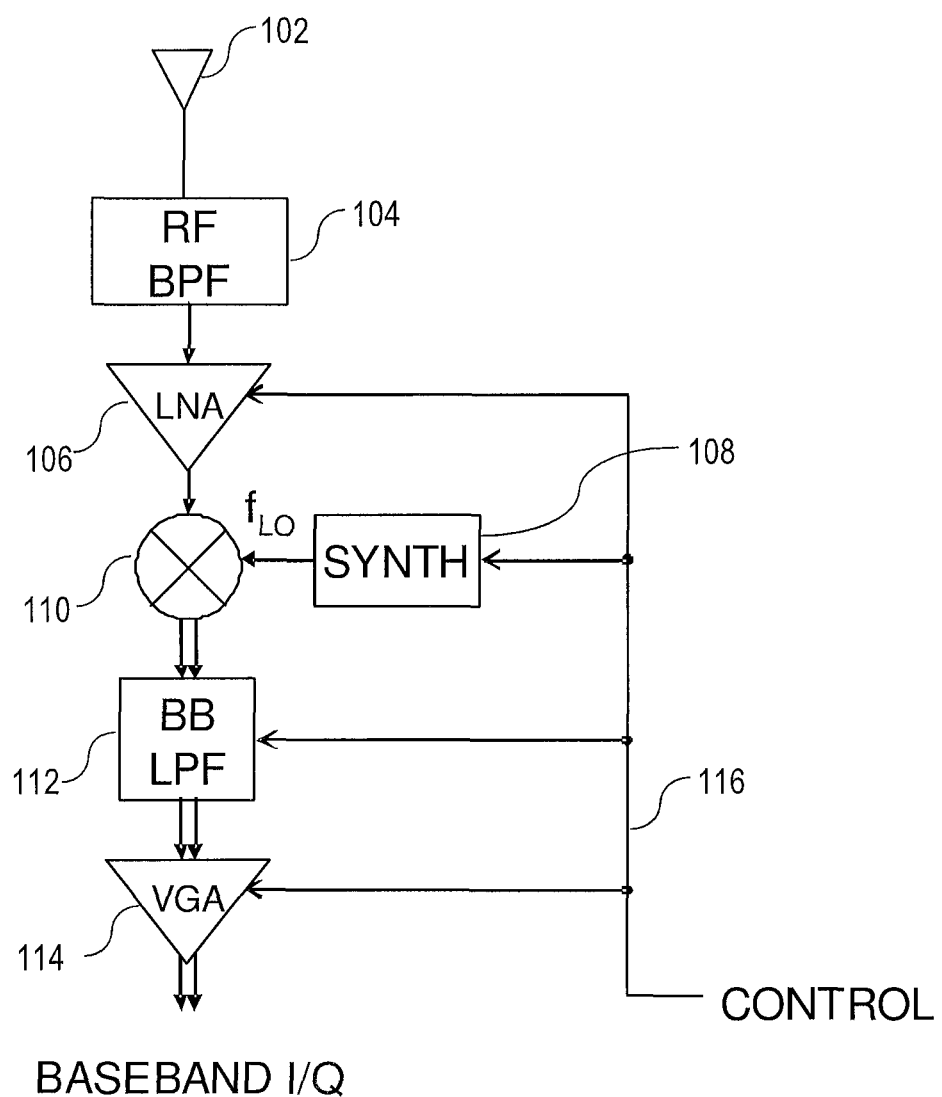
FIG. 1 is a schematic diagram of a direct-conversion RF receiver.
Figure 2:
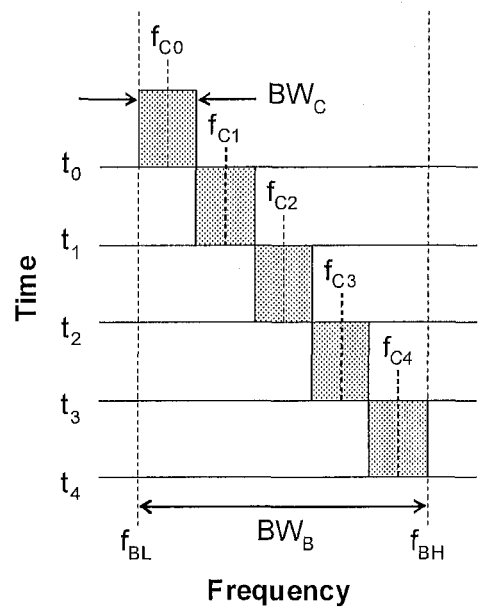
FIG. 2 is an illustration of synchronous, sequential scanning of a frequency bandwidth separated into channels.
Figure 3:
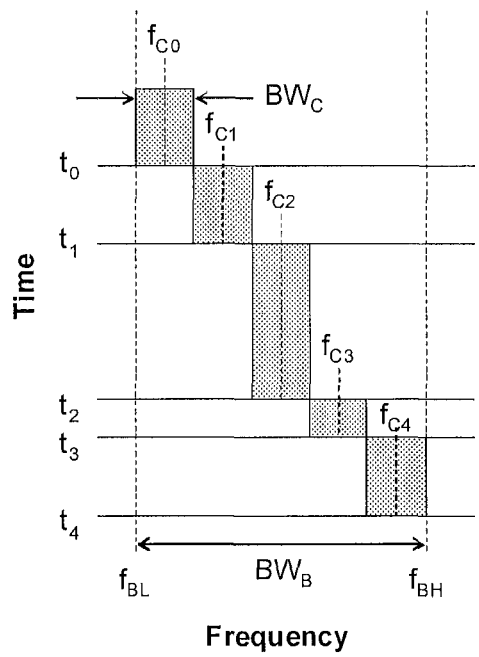
FIG. 3 is an illustration of asynchronous scanning for an arbitrary scanning protocol for the channels shown in FIG. 2.
Figure 4:
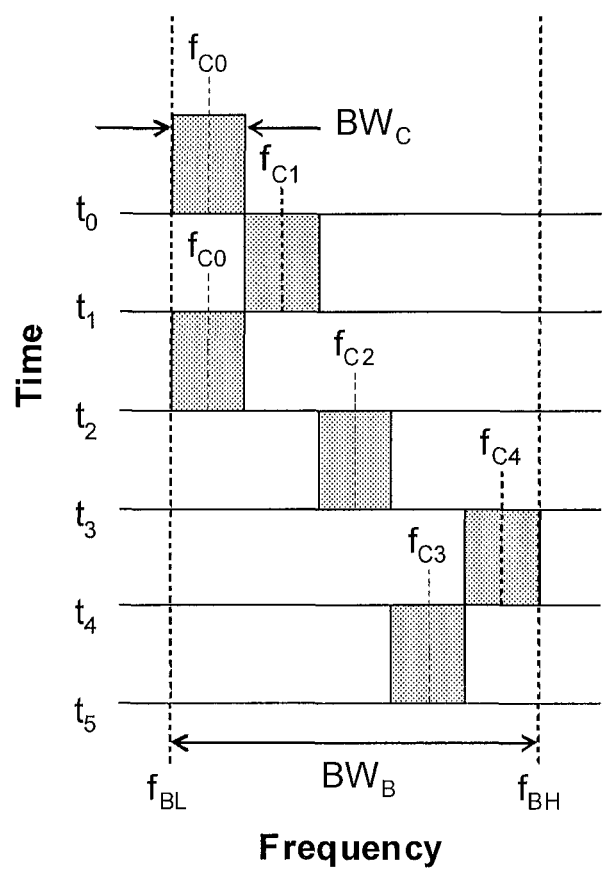
FIG. 4 is an illustration of non-sequential scanning protocol for the channels shown in FIG. 2.

In step 602 of FIG. 6, the scanning protocol is initialized. In this non-limiting example, the RF band and channels are fixed, and dwell time and scanning order may vary. Absent prior knowledge regarding the location of a SOI, a reasonable initial scanning protocol would be that illustrated in FIG. 2, in which five non-overlapping channels {C0, C1, C2, C3, C4} are scanned in sequential order with each channel scan time of an equal duration of time T. Then, in this example, a complete scan of all channels as determined by the initial scanning protocol would take a total time of 5 T.

In step 604, channels are scanned according to the determined scanning protocol, resulting in a set of sampled data. While this illustration presupposes a fixed data sampling rate, the data sampling rate could be incorporated into the scanning protocol as a parameter that could be varied. For example, it could be determined that a lack of an identified SOI may be caused in part by a data sampling rate that is too low, and thus the data sampling rate could be increased for future scans. Similarly, a data sampling rate may be lowered in certain situations, leading to a decrease in processing time.

In step 606, the received signal data is processed. As previously explained with regard to baseband signal processor 530, several filtering and signal processing techniques may be applied to the signal data to obtain time-domain and frequency-domain information.

Figure 7:
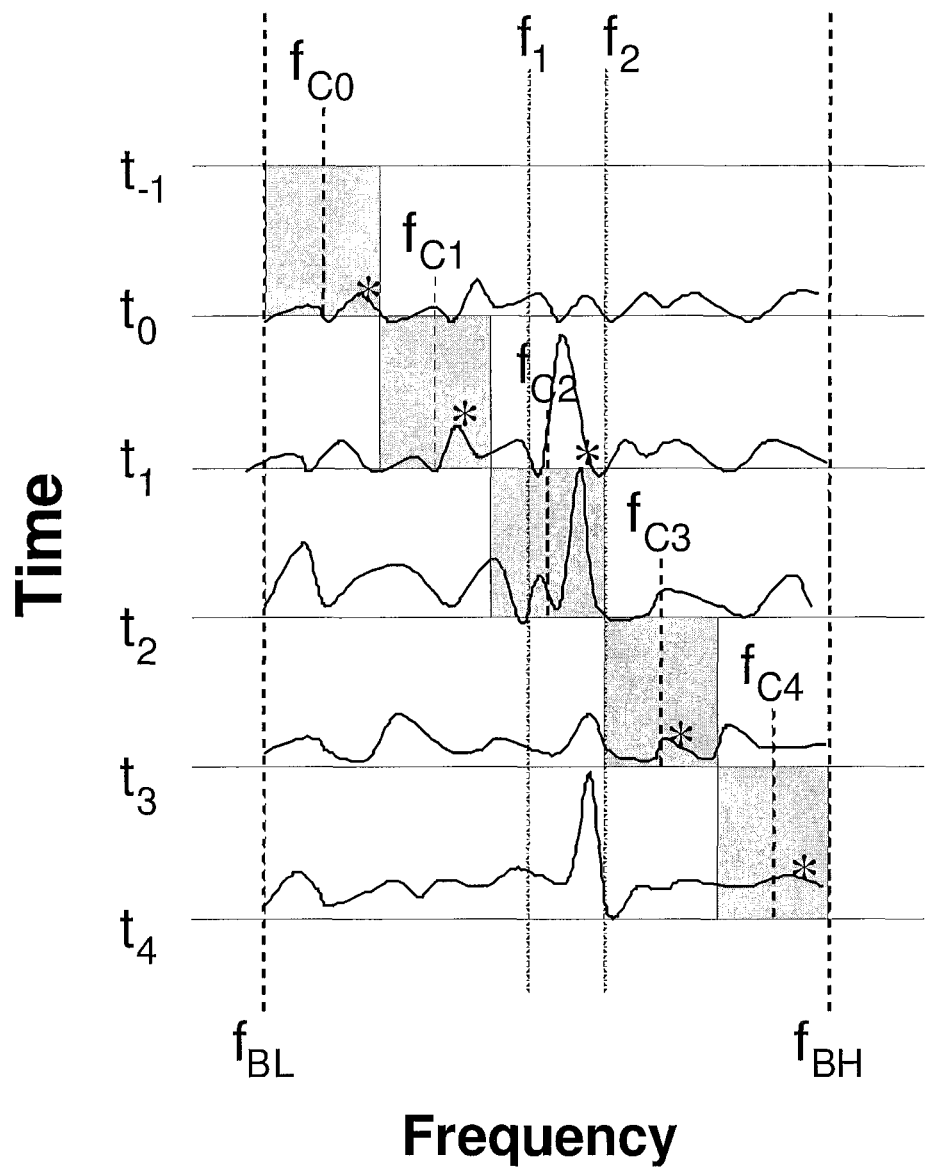
FIG. 7 is an illustration of power spectra over a frequency range at times $\{t_0, t_1, t_2, t_3, t_4\}$ in which sample data is taken over the channel and time period corresponding to the shaded area of each spectra, and using a sequential scanning protocol.

In step 608, the calculated time-domain and frequency-domain information is used to form signal discriminants used to identify a SOI. FIG. 7 is an illustration of power spectra over a frequency range at times $\{t_0, t_1, t_2, t_3, t_4\}$ in which sample data is taken over the channel and time period corresponding to the shaded area of each spectra, and a sequential scanning protocol is used.

FIG. 7 displays the power spectrum for the frequency band beginning at frequency $f_{BL}$ and ending at $f_{BH}$ for the signal as of sampling time beginning at time equals $t_{-1}$ and lasting through time equals $t_4$. For the illustrated example, a pulsed, continuous-wave SOI that lies between frequencies $f_1$ and $f_2$ is used as input.

Each shaded region of the plots shown on FIG. 7 corresponds to the channel scanned starting at each respective sampling time; for example, channel C0 (having center frequency $f_{C0}$) is scanned during the time interval $(t_{-1}, t_0)$, with the resulting power spectrum displayed along the frequency axis in FIG. 7 for time equal to $t_0$. The next scanned channel is channel C1 (having center frequency $f_{C1}$) during the time interval $(t_0, t_1)$ with the resulting power spectrum displayed along the frequency axis in FIG. 7 for time equal to $t_1$. As shown by arrangement of shaded regions having approximately equal areas, the scanning protocol corresponds to a synchronous sequential scan.

For this non-limiting, illustrated example, the selected signal discriminant is the frequency and bandwidth where the peak value occurs in the channel. For each shaded region of FIG. 7 corresponding to a scanned channel, the approximate peak value is denoted by an asterisk "*."

Thus, for the combination of the: (1) scanning protocol illustrated in FIG. 7, (2) signal data illustrated in FIGS. 7, and (3) selected signal discriminant, the FFT at time $t_2$ of channel C2 captures the SOI.

In the example shown above, the selection of the SOI can be made by relative comparison of all possible candidates, with the selected SOI corresponding to the candidate whose value lies furthest from the average of samples. Such a selection method could obtain accurate and quick results in a situation in which (1) the noise floor for all channels is low, (2) no channels suffer from interference, (3) the true SOI fails to satisfy comparison tests with respect to actual values, but (4) the true SOI stands out relative to the other candidates.

In an embodiment, the selection of the SOI can be made by comparison of all possible candidates to values predicted by a model. In an embodiment, the selection of the SOI can be made using maximum likelihood estimation techniques.

In an embodiment, the selection of the SOI can be made by comparison of all possible candidates to values supplied as input. The selection of the SOI can itself be adaptive, using a neural network or another adaptive or trainable algorithm trained with data taken from known signal type and discriminant combinations.

With reference back to step 610 of FIG. 6, the protocol parameters are adjusted so that next scanning sequence will sample more data measured in channel C2, to better extract features of the SOI. With the protocol parameters thus updated, the procedure returns to the channel scan of step 604.

In an embodiment, the dwell time is increased on the channel believed to contain the SOI. In an alternative embodiment, the dwell time for each channel is held constant while multiple visits of the channel believed to contain the SOI are made during a full scanning cycle. In an alternative embodiment, the duration of the complete scanning cycle is fixed, and each channel not believed to contain the SOI remains in the scanning cycle, but is allocated a shortened dwell time, while the channel believed to contain the SOI is allocated an increased dwell time.

Figure 8:
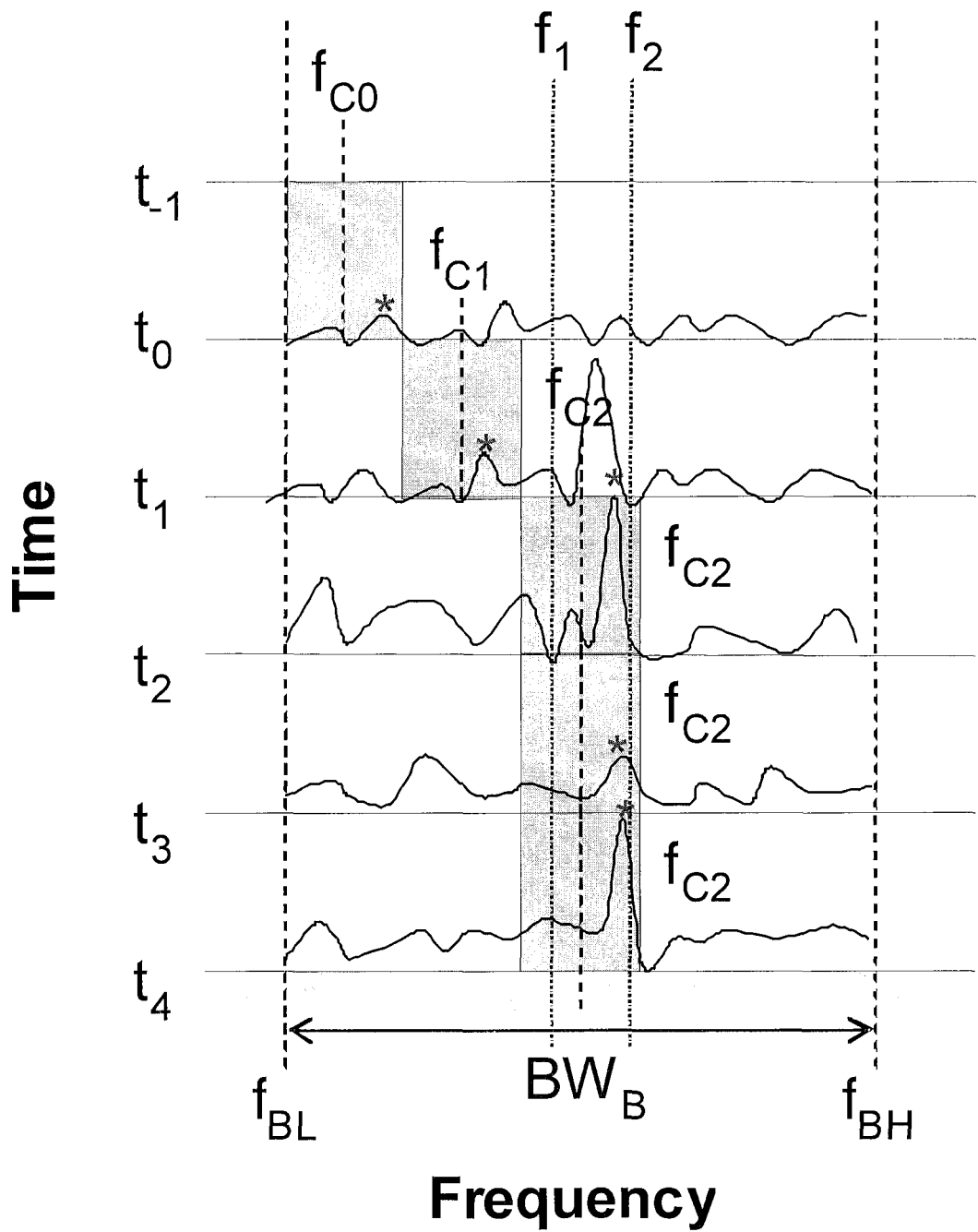
FIG. 8 is an illustration of power spectra over a frequency range at times $\{t_0, t_1, t_2, t_3, t_4\}$ in which sample data is taken over the channel and time period corresponding to the shaded area of each spectra, and using an adaptive scanning protocol.

FIG. 8 illustrates the results in which the scanning protocol parameters are changed to collect more data in the channel C2, the channel believed to contain the SOI. In this example, the scanning protocol is changed to triple the dwell time on channel C2 by deleting scans on channels C3 and C4. By so doing, the adaptive scanning protocol is able to quickly and efficiently acquire more data related to the SOI, and then re-adapt should the signal change.

Although not illustrated, the adaptive channel scanner and method may be used to locate an SOI which itself follows an arbitrary hopping sequence, such as a pseudo-random hopping sequence used as part of a transmission made using the Bluetooth standard. Such a protocol likely would not be sequential, and may not be synchronous should a transmission remain on.

Although not illustrated, the adaptive channel scanner and method may be used to locate multiple signals of interest, in which each SOI is distinguishable by one or more signature characteristics such as peak magnitude frequency power, pulse-repetition interval, or any combination of information produced by baseband signal processor 530. For example, in an environment containing two radar signals, with one radar signal located closer to the adaptive channel scanner than the second radar signal, the adaptive channel scanner could differentiate between the two signals via a combination of differing pulse-repetition intervals and power-spectral densities, even if the radars operated on a common frequency.

III. Example Signal Analysis Data Flow

Figure 9:
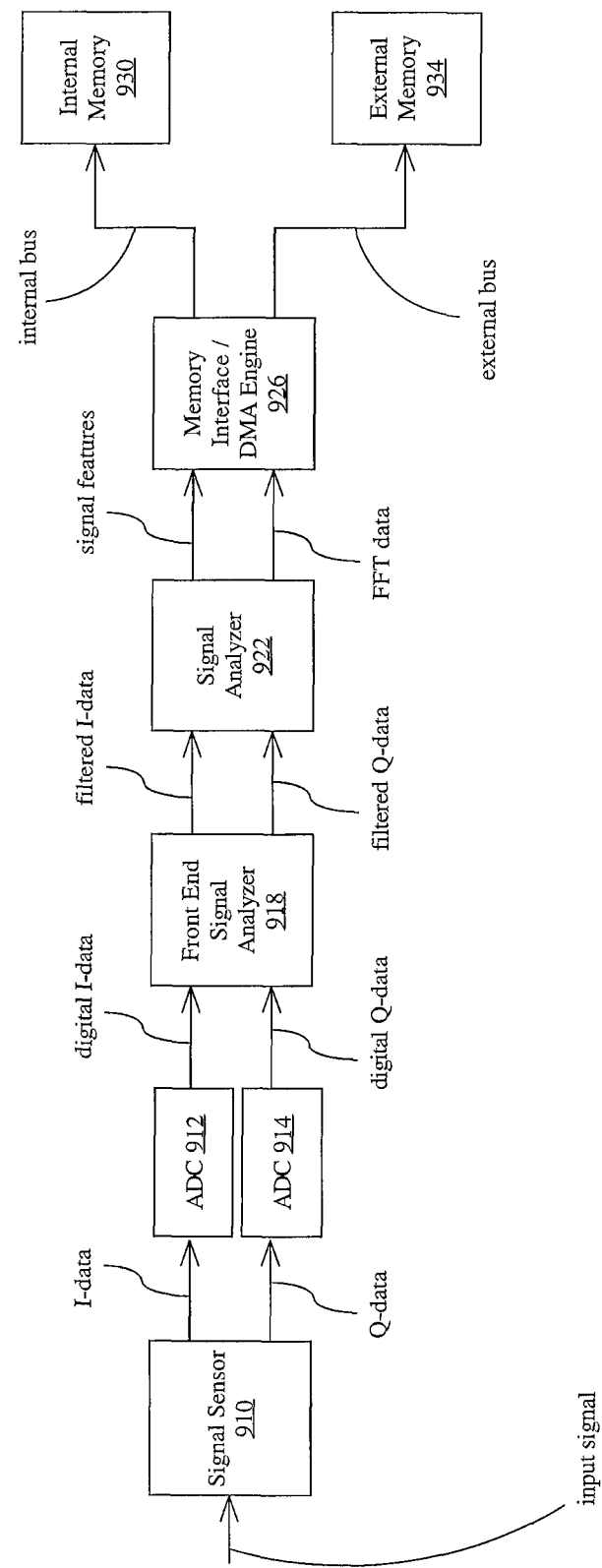
FIG. 9 depicts a signal analysis integrated circuit data flow upon which embodiments may be implemented.

FIG. 9 depicts a signal analysis integrated circuit data flow. Data flow begins upon receipt of input signal waveforms by signal sensor 910. The system starts by receiving signal waveforms from the signal sensor. In an embodiment, signal sensor 910 is an internal radio implemented on the signal analysis integrated circuit which houses the hardware, software, and firmware that is the subject of this application. Example signal analysis integrated circuit architectures are discussed later below.

In an embodiment, signal sensor 910 is an external radio. In an embodiment, signal sensor is an external sensor, such as a hydrophone. Should signal sensor 910 either comprise an internal or external radio, once the radio demodulates received RF signals to baseband, then the signal leaving signal sensor 910 comprises in-phase (abbreviated I) and quadrature (abbreviated Q) components, shown in FIG. 9 as "I-data" and "Q-data," respectively. Such a configuration, while unnecessary to practice the invention, is used in the remainder of the application for the convenience of the reader.

Should signal sensor 910 not comprise a radio, then the signal leaving signal sensor 910 may comprise an analog baseband signal (with I and Q components).

I-data leaving signal sensor 910 enters ADC 912, and Q-data leaving signal sensor 910 enters ADC 914. Output of each of ADC 912 and ADC 914 is a digital representation of analog signals. Each digital representation is quantized to a finite number of bits. ADC 912 and ADC 914 each sample the analog signals at a specific clock frequency, known as the "sample frequency". The sample frequency may be, for example, 80 MHz or equivalently 80 million samples per second.

Digital I-data leaving ADC 912 and digital Q-data leaving ADC 914 is then fed into front-end signal analyzer 918. Front-end signal analyzer 918 performs digital filtering and DC offset removal. Filtered I-data and filtered Q-data leaves front end signal analyzer 918 and enters signal analyzer 922 for determination of the time- and frequency-domain characteristics of the signal, along with FFT data suitable for spectrum analysis.

Signal analyzer 922 packetizes the time- and frequency-domain output for input to memory interface/DMA engine 926, which writes the signal features and FFT data to memory. This memory may be internal 930 to the IC or external 934 to the IC. External memory is accessed using an external bus that is connected to the IC.

IV. Example Signal Analysis Integrated Circuit Architecture

Figure 10:
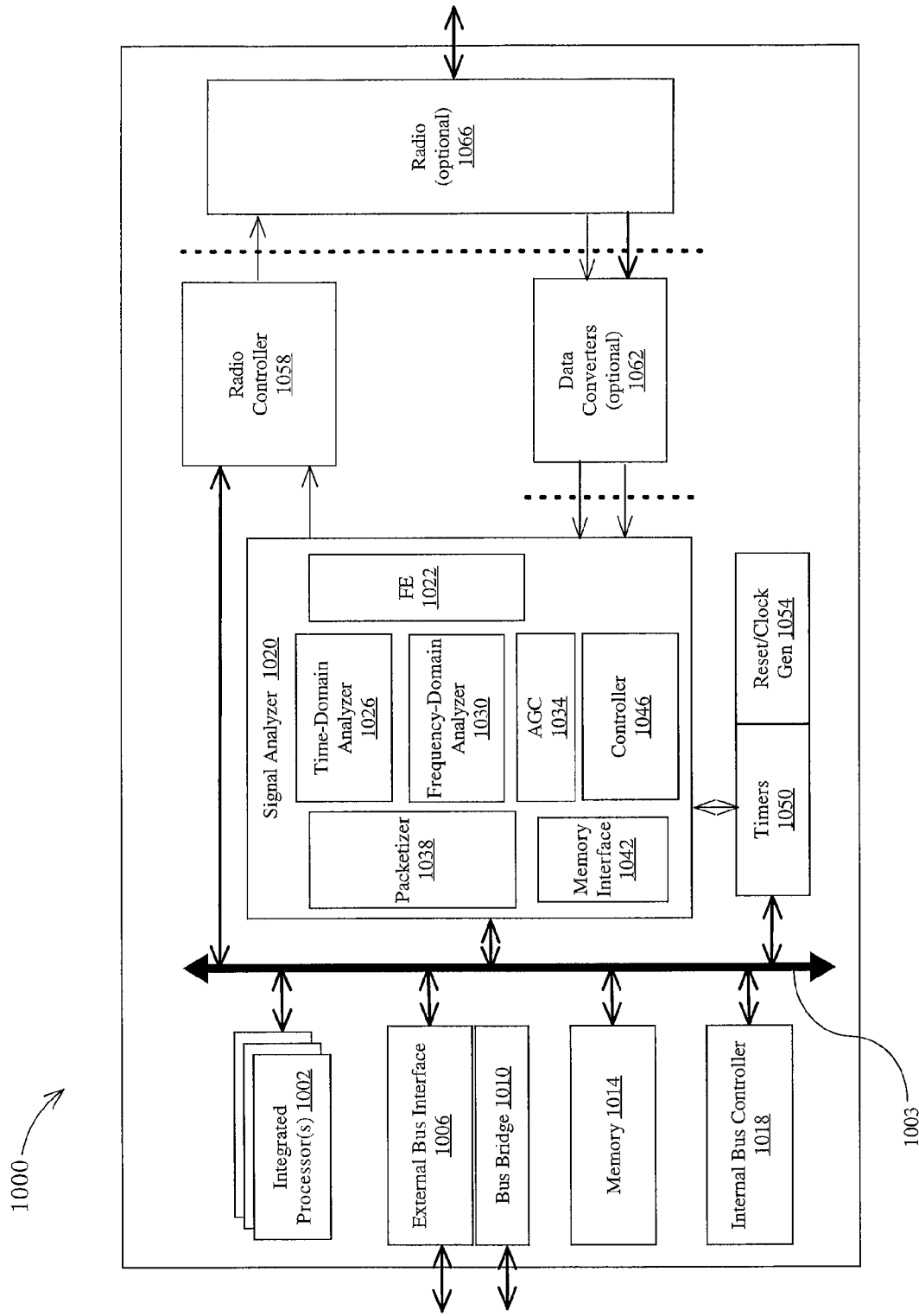
FIG. 10 depicts an embodiment of a signal analysis integrated circuit architecture.

FIG. 10 depicts an embodiment of a signal analysis integrated circuit architecture. Integrated circuit 1000 comprises main bus 1003, one or more integrated processors 1002, external bus interface 1006, memory 1014, internal bus controller 1018, signal analyzer 1020, timers 1050, reset/clock generator 1054, radio controller 1058, optional data converters 1062, and optional radio 1066. Signal analyzer 1020 is itself comprised of multiple components, and is described later with respect to FIGS. 11-12.

Main bus 1003 provides electrical connections among one or more integrated processors 1002, external bus interface 1006, memory 1014, signal analyzer 1020, timers 1050, and radio controller 1058. Control of main bus 1003 is provided by internal bus controller 1018. In the discussion below, components connected to main bus 1003 are first described, followed by a description of signal analyzer 1020.

A. Components Connected to Main Bus (Other Than Signal Analyzer)

Although only one connection from one or more integrated processors 1002 to main bus 1003 is displayed in FIG. 10, each processor may communicate independently of other processors with main bus 1003 using a connection dedicated to the processor.

Each of the one or more integrated processors 1002 is programmable and used to process the time and frequency domain feature data provided by signal analyzer 1020. In an embodiment, one or more of the integrated processors 1002 is based on a RISC architecture and may include programmable firmware, instruction memory and cache, data memory and cache.

The programmable firmware provides for programming for many different applications. In an embodiment, at least one of the one or more integrated processors 1002 has control over a signal sensor, such as an external radio, connected to integrated circuit 1000. In an embodiment, at least one of the one or more integrated processors 1002 may tune an external radio to several different channels over a specific period, while signal analyzer 1020 collects data from each channel. In an embodiment, at least one of the one or more integrated processors 1002 may collect time domain and frequency domain features of pulses received by signal analyzer 1020 and run algorithms on the collected pulse data in order to classify the source of the received pulses.

Communications between integrated circuit 1000 and external devices is provided by external bus interface 1006 and bus bridge 1010. In an embodiment, external bus interface 1006 comprises a Peripheral Component Interface (PCI) bus interface. In an embodiment, external bus interface 1006 comprises a PCI Express bus interface. In an embodiment, external bus interface 1006 comprises a Universal Serial Bus (USB).

Bus bridge 1010 bridges the primary bus used by the integrated circuit 1000 to communicate with an external computer or device with a secondary bus interface. Devices attached to this secondary bus can then interface with the external computer or device on the primary bus through the bus bridge 1010.

Integrated circuit additionally contains memory 1014 connected to main bus 1003. Memory 1014 may include any types of volatile and non-volatile memory, depending upon a particular implementation. Memory 1014 is accessible via bus 1003, e.g., by integrated processors 1002 or signal analyzer 1020.

Timers 1050 communicate with main bus 1003 and with signal analyzer 1020. Timers 1050 (and connected reset/clock generator 1054) provide several general purpose timers that may be used by one or more integrated processors 1002. Timers 1050 may also be programmed to generate an interrupt signal to be sent to one or more integrated processors 1002 at a specified time. Reset/clock generator 1054 comprises a system timer which reports how long integrated circuit 1000 has been in operation. Signal analyzer 1020 also using timing information from reset/clock generator 1054 to time stamp "datagrams" or "feature vectors" created by signal analyzer 1020.

Radio controller 1058 also communicates with main bus 1003. Radio controller 1058 provides an interface to a radio internal to integrated circuit 1000 (such as optional radio 1066) or to a radio external to integrated circuit 1000. Radio controller 1058 connects gain pins of the radio to AGC 1034 located within signal analyzer 1020 (and discussed below). Radio controller 1058 also connects control lines and the serial interface of the radio to one or more integrated processors 1002 via main bus 1003.

B. Signal Analyzer

Signal analyzer 1020 determines the time-domain and frequency-domain characteristics of received signals. Information is compiled into packets and passed from signal analyzer 1020 to internal or external memory. In an embodiment, signal analyzer 1020 is implemented using a gate array design. In an embodiment, signal analyzer 1020 is implemented using a full-custom design. In an embodiment, signal analyzer 1020 is implemented using a structured/platform design.

Signal analyzer 1020 comprises front end 1022, time-domain analyzer 1026, frequency-domain analyzer 1030, automatic gain control (AGC) 1034, packetizer 1038, memory interface 1042, and controller 1046. Time-domain analyzer 1026 and frequency-domain analyzer 1030 will be more fully discussed later with respect to FIGS. 11-12.

Signal data enters signal analyzer 1020 through front end 1022. Front end 1022 operates on digital signal data originating either from analog data converters 1062 or analog data converters connected to integrated circuit 1020. Front end 1022 filters the incoming signal data using a low-pass filter to remove signals outside of a desired channel and to prevent aliasing if any further down-sampling is performed. Front end 1022 also measures, and optionally removes, the DC offset (DCO) of the signal that was added by either radio 1066 or analog data converters 1062.

AGC 1034 is used to ensure the signal level inside signal analyzer 1020 lies within a specified range. AGC 1034 computes an average magnitude of the incoming signal data and adjusts the gain of the component providing the data, such as a radio, to keep the signal level within the specified range.

Packetizer 1038 bundles signal feature data provided by time-domain analyzer 1026 and frequency-domain analyzer 1030 into a feature vector or datagram. Embodiments of a feature vector will be discussed later with respect to frequency-domain analyzer 1026 and time-domain analyzer 1030. The feature vector is collected for each individual pulse that is detected by time-domain analyzer 1026. In an embodiment, feature vectors are stored in a buffer, for access by memory interface 1042.

Memory interface 1042 writes feature vectors collected in packetizer 1038 either to memory 1014 or memory accessible through external bus interface 1006 or bus bridge 1010. In an embodiment, memory interface 1042 also provides an interrupt to one or more integrated processors 1002 indicating feature vectors are available for processing. In an embodiment, memory interface 1042 writes feature vectors collected in packetizer 1038 directly to one or more integrated processors 1002.

Controller 1046 synchronizes operation of time-domain analyzer 1026, frequency-domain analyzer 1030, packetizer 1038, and memory interface 1042. Additionally, controller 1046 ensures packetizer 1038 collects data from time-domain analyzer 1026, frequency-domain analyzer 1030 at the correct times so that packetizer 1038 may pass the collected data to memory interface 1042 for processing by one or more integrated processors 1002.

1. Time-Domain Analyzer

Figure 11:
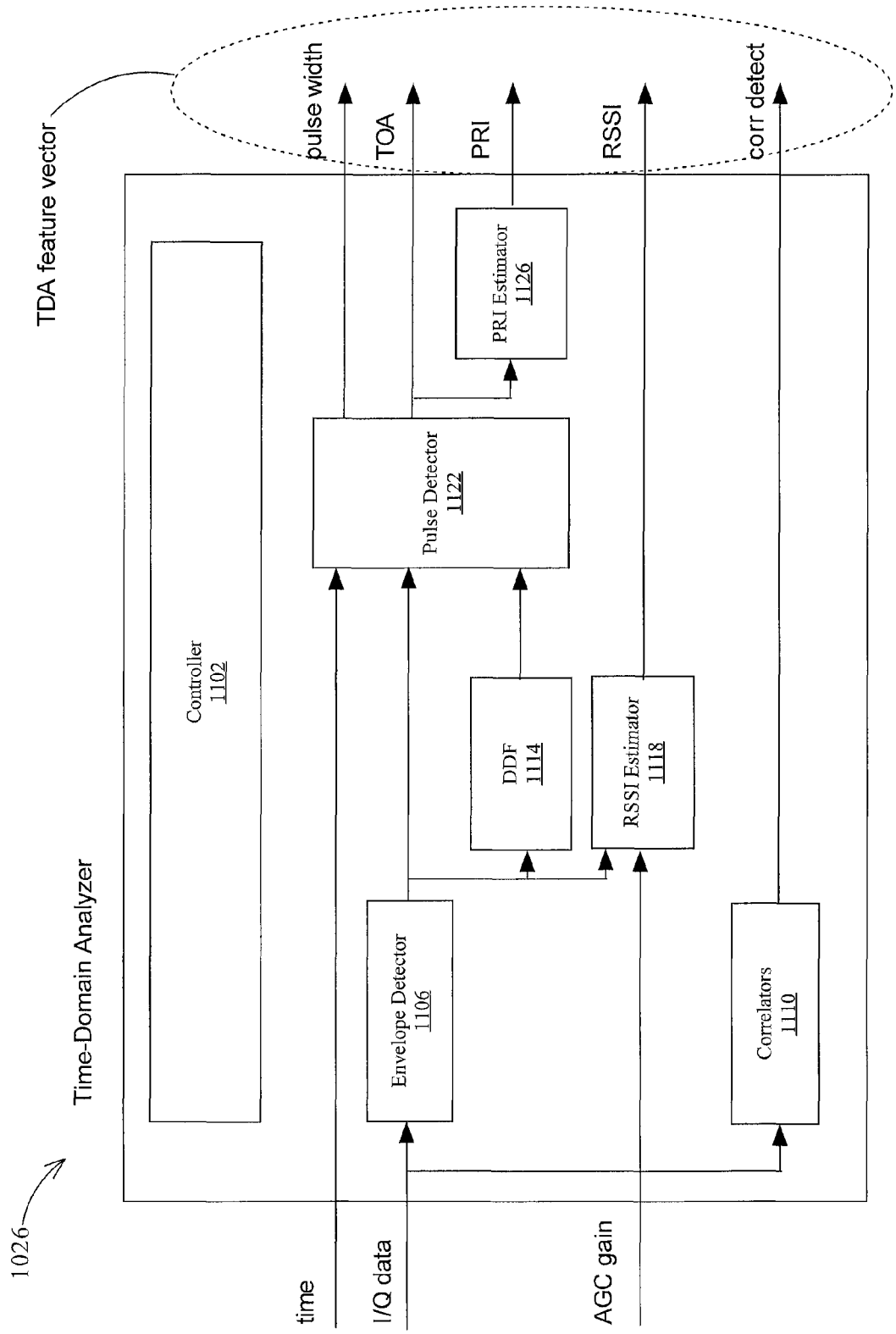
FIG. 11 depicts a time-domain analyzer data flow.

The data flow of an embodiment of time-domain analyzer 1026 is depicted in FIG. 11. Time-domain analyzer 1026 comprises controller 1102, envelope detector 1106, correlators 1110, digital differentiation filter (DDF) 1114, RSSI estimator 1118, pulse detector 1122, and PRI estimator 1126. In an embodiment, time-domain analyzer 1026 is implemented using a gate array design. In an embodiment, time-domain analyzer 1026 is implemented using a full-custom design. In an embodiment, time-domain analyzer 1026 is implemented using a structured/platform design.

Input signals received by time-domain analyzer 1026 include timing information received by pulse detector 1122, filtered I-data and filtered Q-data received by both envelope detector 1106 and correlators 1110, and AGC gain information received by RSSI estimator 1118.

As described below, controller 1102 controls various aspects of the processing performed by time-domain analyzer 1026. Connections between controller 1102 and envelope detector 1106, correlators 1110, digital differentiation filter (DDF) 1114, RSSI estimator 1118, pulse detector 1122, and PRI estimator 1126 are not depicted in FIG. 11, in order to make the other connections depicted in FIG. 11 more salient.

Envelope detector 1106 computes information corresponding to a smoothed signal envelope, and forwards this information to pulse detector 1122, DDF 1114, and RSSI estimator 1118.

Correlators 1110 perform auto-correlation or cross-correlation using filtered I-data and filtered Q-data against programmable pilot signals to detect known signal structures. For example, each member in the 802.11 family of protocol standards uses packetized data including a signal preamble. These known signal preambles may be programmed into correlators 1110. Additionally, a signal preamble believed to correspond to the upcoming 802.11n standard may programmed into correlators 1110, and should the final 802.11n standard use a different signal preamble, the final signal preamble may be programmed into correlators 1110.

In an embodiment, correlators 1110 comprise hardware delay lines, multipliers, adders, and control logic. Correlators 1110 output a signal that is passed to packetizer 1038. The signal output from correlators 1110 is also included as a component in a time-domain feature vector output from time-domain analyzer 1026.

In an embodiment, the output signal of correlators 1110 is also sent to controller 1102. Controller 1102 inspects the output signal value of correlators 1110, and should the output signal value indicate receipt of a known signal by radio 1066, controller 1102 may direct other modules located on integrated circuit 1000 to halt or modify signal processing. For example, upon determination by controller 1102, using the output signal of correlators 1110, that an input radio signal contains a preamble of a type belonging to the 802.11 family, controller 1102 may then direct frequency-domain analyzer 1030 to modify or halt processing.

DDF 1114 computes a low pass-filtered derivative of the signal envelope. The low pass-filtered derivative is then provided to pulse detector 1122. In an embodiment, DDF 1114 comprises a finite impulse response filter.

RSSI estimator 1118 computes a smoothed received signal strength indication (RSSI) of the power (in units of dBm) present in the received radio signal from radio 1066. In an embodiment, output of RSSI estimator 1118 is one of the components that comprise the time-domain feature vector output from time-domain analyzer 1026.

Pulse detector 1122 performs pulse detection and outputs a pulse width estimate and a pulse time of arrival (TOA). In an embodiment, both the pulse width estimate and the TOA are components in the time-domain feature vector output from time-domain analyzer 1026.

2. Frequency-Domain Analyzer

Figure 12:
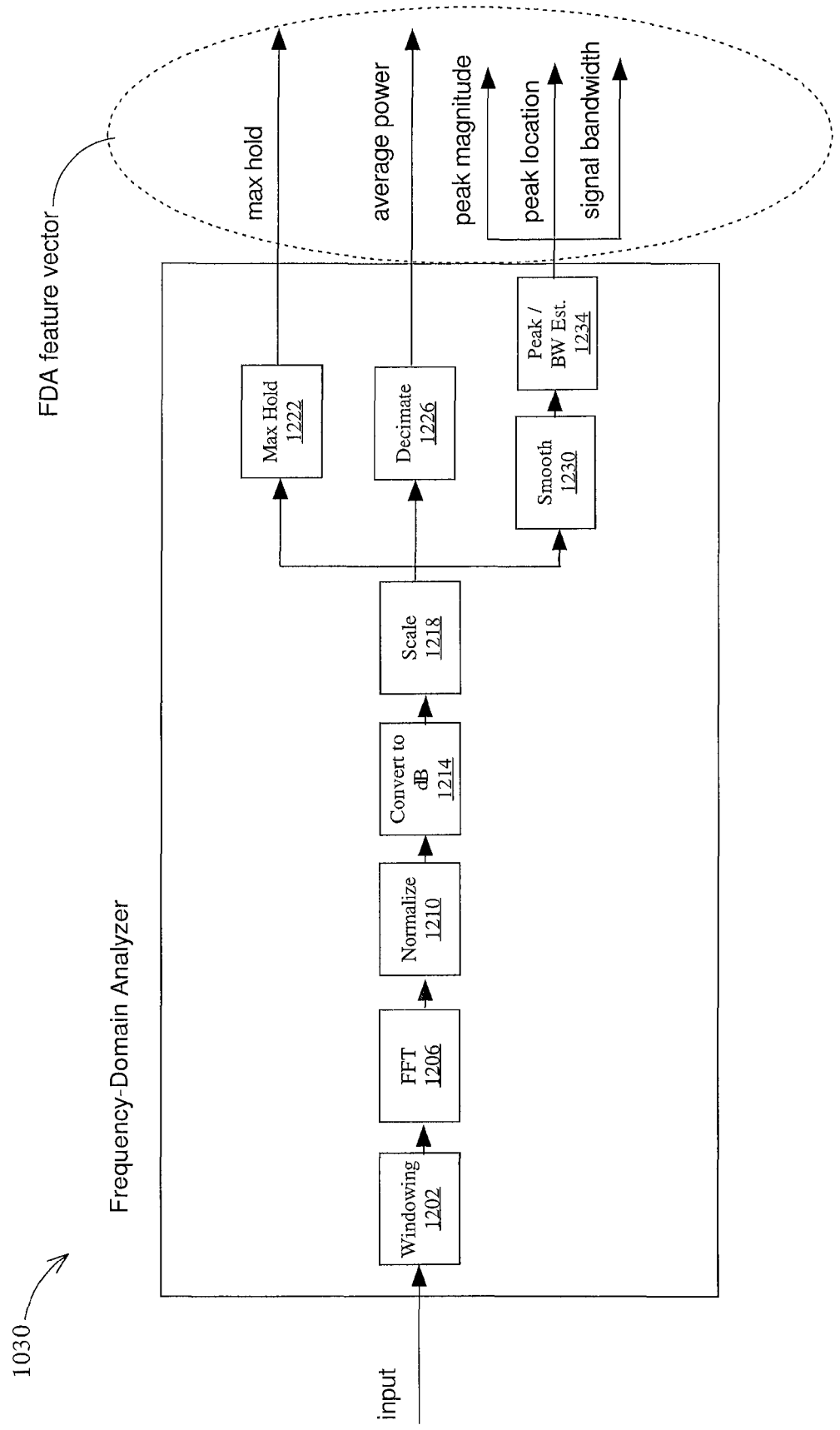
FIG. 12 depicts a frequency domain analyzer data flow.

The data flow of an embodiment of frequency-domain analyzer 1030 is depicted in FIG. 12. In an embodiment, frequency-domain analyzer 1030 is implemented using a gate array design. In an embodiment, frequency-domain analyzer 1030 is implemented using a full-custom design. In an embodiment, frequency-domain analyzer 1030 is implemented using a structured/platform design.

In an embodiment, frequency-domain analyzer 1030 and time-domain analyzer 1026 process signal data concurrently. In an embodiment, concurrent processing by frequency-domain analyzer 1030 and time-domain analyzer 1026 may be modified in real-time by controller 1046. For example, controller 1046 may receive a signal from correlators 1110 indicating a particular type of input signal has been detected, and in response, controller 1046 directs time-domain analyzer 1026 to modify its current operations.

Input data enters frequency-domain analyzer 1030 is organized into frames and a windowing operation is applied in windowing step 1202. In an embodiment, a rectangular window is applied to the framed input data. In an embodiment, a Hamming window is applied to the framed input data. In an embodiment, a Hann window is applied to the framed input data. Other windows may also be applied.

At step 1206, a Fast Fourier Transform (FFT) is performed on the windowed signal data to compute a frequency-domain representation of the windowed signal data. The frequency-domain data is then normalized at step 1210, converted to decibels (dB) at step 1214, and scaled at step 1218.

The scaled data is then passed to three processing modules that operate in parallel. At step 1222, a max hold operation is performed on the scaled data over a specified number of frames. A max hold operation is effective at detecting low-duty cycle signals such as bursts or radar pulses.

Concurrent with step 1222, at step 1226 a decimate operation is performed on the scaled data to yield an average power value frame for every N input frames. A power average is effective at distinguishing weak, stationary signals.

Concurrent with steps 1222 and 1226, at step 1230 a smoothing operation is performed, followed at step 1234 by a peak and bandwidth estimation that yields a peak magnitude value, a peak location vale, and a signal bandwidth value.

In an embodiment, one or both of the max hold value and the average power value are components in the frequency-domain feature vector output from frequency-domain analyzer 1030. In an embodiment, one or more of the peak magnitude value, peak location value, and the signal bandwidth value are components in the frequency-domain feature vector output from frequency-domain analyzer 1030.

As previously described, the time-domain feature vectors and frequency-domain feature vectors are processed by firmware on one or more integrated processors 1002 for signal classification. Placement of all hardware and firmware for collection, time- and frequency-domain analysis, and signal classification on a single integrated circuit permits affords lowered power consumption, faster processing as data travels very small distances, and promotes a modular design in which firmware may be easily reprogrammed, or if necessary, customized features may introduced into a device using the integrated circuit, by a simple chip replacement.

V. Implementation Mechanisms

The integrated circuit approach for monitoring communications channels described herein may be implemented in a variety of ways and the invention is not limited to any particular implementation. The integrated circuit may be integrated into a wireless communications system or a wireless device, or may be implemented as a stand-alone mechanism. Furthermore, the approach may be implemented in computer software, hardware, or a combination thereof.

Figure 13:
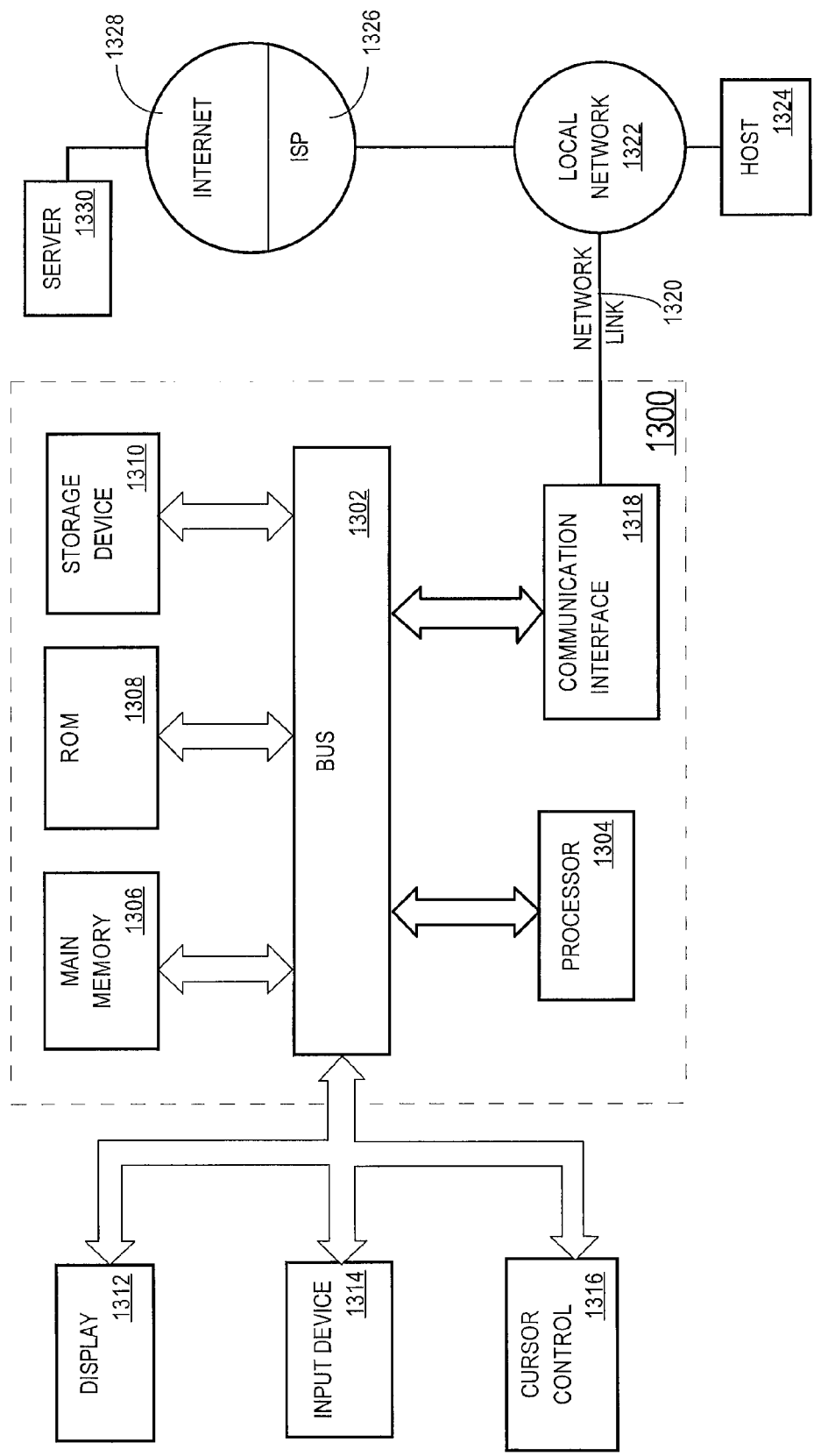
FIG. 13 is a block diagram that illustrates a computer system upon which an embodiment of the invention may be implemented.

FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for implementing the techniques described herein. According to one embodiment of the invention, those techniques are performed by computer system 1300 in response to processor 1304 executing one or more sequences of one or more instructions contained in main memory 1306. Such instructions may be read into main memory 1306 from another machine-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1300, various machine-readable media are involved, for example, in providing instructions to processor 1304 for execution. Such a medium may take many forms, including but not limited to storage media and transmission media. Storage media includes both non-volatile media and volatile media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution. In this manner, computer system 1300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An integrated circuit, comprising:
a bus;
one or more integrated processors connected to the bus; and
a signal analyzer connected to the bus, the signal analyzer including a time-domain analyzer that provides time-domain data that indicates time-domain characteristics of signals and a frequency-domain analyzer that provides frequency-domain data that indicates frequency-domain characteristics of the signals,
wherein the one or more integrated processors cause adaptive scanning to be performed on two or more communications channels based upon at least the time-domain data provided by the time-domain analyzer and the frequency-domain data provided by the frequency-domain analyzer, wherein the adaptive scanning includes one or more of increasing a dwell time for at least one communications channel from the two or more communications channels or changing a scanning sequence for the two or more communications channels.

2. The integrated circuit of claim 1, wherein the time-domain analyzer includes one or more programmable correlators to compare a signal input to the time-domain analyzer to one or more signal protocol patterns.

3. The integrated circuit of claim 2, wherein control of the signal analyzer is based at least in part on output of the programmable correlators.

4. The integrated circuit of claim 1, wherein the one or more integrated processors control a scanning operation to locate a signal of interest, and once located, classify the located signal of interest.

5. The integrated circuit of claim 1, wherein the time-domain analyzer determines a first feature vector based at least in part on a signal input to the time-domain analyzer, the first feature vector including one or more of: pulse width, pulse time of arrival, pulse repetition interval, received signal power, and correlation of the signal input to the time-domain analyzer with respect to one or more signal protocol patterns.

6. The integrated circuit of claim 1, wherein the frequency-domain analyzer determines a second feature vector based at least in part on a signal input to the frequency-domain analyzer, the second feature vector including one or more of: max hold spectrum, decimated spectrum, peak magnitude level, peak magnitude frequency, and bandwidth.

7. The integrated circuit of claim 1, wherein the adaptive scanning includes decreasing a dwell time for one or more other communications channels from the two or more communications channels.

8. The integrated circuit of claim 1, wherein changing a scanning sequence for the two or more communications channels includes for a particular scanning sequence of the two or more communications channels scanning a particular communications channel a greater number of times than one or more other communications channels in the two or more communications channels.

9. The integrated circuit of claim 1, wherein the adaptive scanning includes one or more of changing a scanning bandwidth or changing a segmentation of the bandwidth into communications channels.

10. The integrated circuit of claim 1, wherein the one or more integrated processors causing adaptive scanning to be performed includes generating and transmitting one or more control signals to a signal sensor.

11. An integrated circuit, comprising:
a bus;
means for processing; and means for performing signal analysis connected to the bus, the means for performing signal analysis including means for performing time-domain analysis that provides time-domain data that indicates time-domain characteristics of signals and means for performing frequency-domain analysis that provides frequency-domain data that indicates frequency-domain characteristics of the wherein the means for processing causes adaptive scanning to be performed on two or more communications channels based upon at least the time-domain data provided by the means for performing time-domain analysis and the frequency-domain data provided by the means for performing frequency-domain analysis, wherein the adaptive scanning includes one or more of increasing a dwell time for at least one communications channel from the two or more communications channels or changing a scanning sequence for the two or more communications channels.

12. The integrated circuit of claim 11, wherein the means for performing time-domain analysis includes correlation means to compare a signal input to the means for performing time-domain analysis to one or more signal protocol patterns.

13. The integrated circuit of claim 12, wherein control of the means for performing signal analysis is based at least in part on output of the correlation means.

14. The integrated circuit of claim 11, wherein the means for processing control a scanning operation to locate a signal of interest, and once located, classify the located signal of interest.

15. The integrated circuit of claim 11, wherein the means for performing time-domain analysis determines a first feature vector based at least in part on a signal input to the means for performing time-domain analysis, the first feature vector including one or more of: pulse width, pulse time of arrival, pulse repetition interval, received signal power, and correlation of the signal input to means for performing time-domain analysis with respect to one or more signal protocol patterns.

16. The integrated circuit of claim 11, wherein the means for performing frequency-domain analysis determines a second feature vector based at least in part on a signal input to the means for performing frequency-domain analysis, the second feature vector including one or more of: max hold spectrum, decimated spectrum, peak magnitude level, peak magnitude frequency, and bandwidth.

17. The integrated circuit of claim 11, wherein the adaptive scanning includes decreasing a dwell time for one or more other communications channels from the two or more communications channels.

18. The integrated circuit of claim 11, wherein changing a scanning sequence for the two or more communications channels includes for a particular scanning sequence of the two or more communications channels scanning a particular communications channel a greater number of times than one or more other communications channels in the two or more communications channels.

19. The integrated circuit of claim 11, wherein the adaptive scanning includes one or more of changing a scanning bandwidth or changing a segmentation of the bandwidth into communications channels.

20. The integrated circuit of claim 11, wherein the means for processing causing adaptive scanning to be performed includes generating and transmitting one or more control signals to a signal sensor.

* * * * *